United States Patent
Giacobello et al.

(10) Patent No.: US 9,633,671 B2
(45) Date of Patent: Apr. 25, 2017

(54) VOICE QUALITY ENHANCEMENT TECHNIQUES, SPEECH RECOGNITION TECHNIQUES, AND RELATED SYSTEMS

(71) Applicant: Apple Inc., Cupertino, CA (US)

(72) Inventors: Daniele Giacobello, Los Angeles, CA (US); Jason Wung, Los Angeles, CA (US); Joshua Atkins, Pacific Palisades, CA (US); Ramin Pichevar, Culver City, CA (US); Raghavendra Prabhu, Redondo Beach, CA (US)

(73) Assignee: APPLE INC., Cupertino, CA (US)

( * ) Notice: Subject to any disclaimer, the term of this patent is extended or adjusted under 35 U.S.C. 154(b) by 113 days.

(21) Appl. No.: 14/517,700

(22) Filed: Oct. 17, 2014

(65) Prior Publication Data
US 2015/0112672 A1 Apr. 23, 2015

Related U.S. Application Data

(60) Provisional application No. 61/893,147, filed on Oct. 18, 2013, provisional application No. 61/937,522, (Continued)

(51) Int. Cl.
*G10L 15/20* (2006.01)
*G10L 21/0208* (2013.01)
*H04M 9/08* (2006.01)

(52) U.S. Cl.
CPC ......... *G10L 21/0208* (2013.01); *H04M 9/082* (2013.01)

(58) Field of Classification Search
CPC ...... G10L 2021/02082; G10L 21/0208; H04M 9/082
(Continued)

(56) References Cited

U.S. PATENT DOCUMENTS 5,574,824 A 11/1996 Slyh et al.
5,991,725 A 11/1999 Asghar et al.
(Continued)

OTHER PUBLICATIONS

J.S. Soo and K.K. Pang; "Multidelay Block Frequency Domain Adaptive Filter," IEEE Trans. on Acoustics, Speech and Sig. Proc., vol. 38, No. 2, pp. 373-376, Feb. 1990.
(Continued)

*Primary Examiner* — Jakieda Jackson
(74) *Attorney, Agent, or Firm* — Ganz Pollard, LLC

(57) ABSTRACT

An echo canceller can be arranged to receive an input signal and to receive a reference signal. The echo canceller can subtract a linear component of the reference signal from the input signal. A noise suppressor can suppress non-linear effects of the reference signal in the input signal in correspondence with a large number of selectable parameters. Such suppression can be provided on a frequency-by-frequency basis, with a unique set of tunable parameters selected for each frequency. A degree of suppression provided by the noise suppressor can correspond to an estimate of residual echo remaining after the one or more linear components of the reference signal have been subtracted from the input signal, to an estimated double-talk probability, and to an estimated signal-to-noise ratio of near-end speech in the input signal for each respective frequency. A speech recognizer can receive a processed input signal from the noise suppressor.

20 Claims, 18 Drawing Sheets

Related U.S. Application Data filed on Feb. 8, 2014, provisional application No. 61/973,155, filed on Mar. 31, 2014, provisional application No. 61/989,995, filed on May 7, 2014.

(58) Field of Classification Search
    USPC .................................................. 704/226, 233
    See application file for complete search history.

(56) References Cited

U.S. PATENT DOCUMENTS

| | | | |
|---|---|---|---|
| 6,549,586 | B2 | 4/2003 | Gustafsson et al. |
| 7,440,891 | B1 * | 10/2008 | Shozakai ................. G10L 15/20 704/226 |
| 8,111,840 | B2 * | 2/2012 | Haulick ................. H04M 9/082 381/318 |
| 8,660,281 | B2 | 2/2014 | Bouchard et al. |
| 2010/0189274 | A1 * | 7/2010 | Thaden ................... G10L 21/02 381/66 |
| 2011/0194685 | A1 * | 8/2011 | van de Laar ......... H04M 9/082 379/406.01 |
| 2012/0171974 | A1 * | 7/2012 | Cimaz ........................ 455/114.2 |
| 2014/0278418 | A1 * | 9/2014 | Chen ....................... G10L 17/00 704/246 |

OTHER PUBLICATIONS

U.S. Appl. No. 61/893,147, filed Oct. 18, 2013; 20 pages.
U.S. Appl. No. 61/937,522, filed Feb. 8, 2014; 30 pages.
U.S. Appl. No. 61/989,995, filed May 7, 2014; 47 pages.
U.S. Appl. No. 61/973,155, filed Mar. 31, 2014; 33 pages.

* cited by examiner

VOICE QUALITY ENHANCEMENT TECHNIQUES, SPEECH RECOGNITION TECHNIQUES, AND RELATED SYSTEMS

RELATED APPLICATIONS

This application claims the benefit of and priority to U.S. Patent Application No. 61/893,147, filed Oct. 18, 2013, U.S. Patent Application No. 61/937,522, filed Feb. 8, 2014, U.S. Patent Application No. 61/973,155, filed Mar. 31, 2014, and U.S. Patent Application No. 61/989,995, filed May 7, 2014, the contents of which are hereby incorporated by reference as if fully recited herein, for all purposes.

BACKGROUND

This application, and the innovations and related subject matter disclosed herein, (collectively referred to as the "disclosure") generally concern digital signal processing techniques and digital signal processors (DSPs) implementing such techniques. More particularly but not exclusively, this disclosure pertains to speech enhancers and speech enhancement techniques for improving speech components in an observed signal, speech recognition techniques, DSPs implementing such enhancement and/or recognition techniques, and systems incorporating such speech enhancers, speech recognition techniques and/or speech enhancement techniques. As but one particular example, objective measures of perceived speech quality can be used for automatically tuning a speech enhancement system applied to an automatically generated speech database. Such a speech enhancement system can be automatically tuned over a substantial number (e.g., thousands or tens of thousands) of combinations of operating conditions (e.g., noise levels and types, full-duplex speech patterns, room impulse response), making disclosed speech enhancers, techniques, and related systems suitable for use in a variety of real-world applications involving full-duplex communications. By contrast, conventional tuning approaches using expert listeners cannot, as a practical matter, be based on such large numbers of combinations of operating conditions given the time and effort required by manual tuning. Consequently, disclosed enhancers, enhancement techniques, and systems can save substantial resources over manual tuning procedures, and can speed development and deployment cycles.

Parameters of a single-microphone speech enhancement system for hands-free devices can be formulated as a large-scale nonlinear programming problem can be selected automatically. A conversational speech database can be automatically generated by modeling interactivity in telephone conversations, and perceptual objective quality measures can be used as optimization criteria for the automated tuning over the generated database. Objective tests can be performed by comparing the automatically tuned system based on objective criteria to a system tuned by expert human listeners. Evaluation results show that disclosed tuning techniques greatly improve enhanced speech quality, potentially saving resources over manual evaluation, speeding up development and deployment time, and guiding the speech enhancer design. A speech enhancement system tuned according to disclosed techniques can improve a perceived quality of a variety of speech signals across computing environments having different computational capabilities, or limitations. Speech recognizers and digital signal processors based on such speech enhancement systems are also disclosed, together with related acoustic (e.g., communication) systems.

Speech enhancers (SE) can serve as a preprocessing stage for a variety of different speech-centric applications, for example, mobile communication, speech recognition, and hearing aids. Speech enhancement can have a fundamental role in extending the usage of such devices to scenarios with severe acoustical disturbances. Given the substantial variety of applications and use scenarios, it is often impractical to design speech enhancers capable of covering all possible interferences. Thus, finding suitable values for the parameters associated with the speech enhancement system to fit a given scenario becomes a central aspect for the proper deployment of speech-centric applications in the real world. Conventional tuning procedures have relied on subjective listening tests. Although well-trained ears may remain a reliable approach for measuring perceived quality of a system, relying on manual tuning of speech enhancers can be very time consuming and resource intensive, commonly taking longer than the design and implementation phases associated with new speech enhancers. Further, the human component in conventional tuning procedures makes them error-prone and bound to cover only a relatively small number of scenarios expected in use.

Automatic tuning of a speech enhancement system using measures such as word error rate or perceptual objective quality measure can efficiently find optimized parameters for a given system instead of relying on human expert for hand-tuning. However, when the speech enhancement system needs to be deployed on a target platform, the computational power of the platform is often limited. The automatic tuning methods in the past oftentimes do not take this limitation of the target platform into consideration.

As but one particular example, speech recognition techniques for distant-talking control of music playback devices are disclosed, together with related DSPs and associated systems.

The human interaction paradigm with music playback devices has seen a dramatic shift with their increased in portability and miniaturization. Well-established interaction media like remote controls are no longer an option and new solutions are needed. Automatic speech recognition (ASR) interfaces offer a natural solution to this problem, considering also the hands-busy, mobility-required, scenarios where these devices are typically used. These scenarios make the ASR technology embedded in these small devices particularly exposed to highly challenging conditions, due to the music playback itself, environmental noise, and general environmental acoustics, e.g., reverberation. In particular, the level of degradation in the input signal, and the consequent drop in ASR performance, can be very significant when the distance between user and microphone increases. In the past decade, the literature on distant-talking speech interfaces suggested several solutions to the problem, e.g., the DICIT project. However, to the inventors' knowledge, the only available solutions to this problem rely heavily on microphone arrays having a plurality of microphones spaced apart from the loudspeakers to provide a relatively high signal-to-echo ratio, making their application unfeasible in portable loudspeakers, and other commercial applications.

Therefore, there remains a need for improved signal processing techniques to enhance speech. In particular, there remains a need for speech enhancers that can be tuned automatically. There also remains a need for objective measures of perceived sound quality as it relates to speech, and there remains a need for automatically generated databases of conversational speech. And, a need remains for digital signal processors implementing automatically tunable speech enhancers. There further remains a need for telephony systems, e.g., speaker phones, having such digital signal processors. A portable stereo speaker having a built-in microphone is but one example of many possible speaker phones. As well, a need remains for an optimization framework to tune a speech enhancement system to maximize the system's performance while constraining its computational complexity in accordance with one or more selected target platforms. There further remains a need for speech enhancement systems which can be tuned either as a speech recognizer front-end or as a full-duplex telephony system. In addition, a need exists for techniques to solve such a nonlinear optimization problem. Further, a need exists for such constrained optimization systems suitable for real-time implementation on one or more selected target platforms. As well, there remains a need for speech recognition techniques suitable for single-microphone systems. There also remains a need for speech-recognition techniques suitable for such systems having the microphone positioned in close proximity to one or more loudspeakers. Further, there remains a need for speech recognition techniques suitable for controlling playback of music on such systems. And, a need exists for DSPs and associated systems configured to implement such speech recognition techniques.

SUMMARY

The innovations disclosed herein overcome many problems in the prior art and address the aforementioned or other needs. In some respects, the innovations disclosed herein are directed to methods for tuning output effective parameters of a speech enhancement system, and more particularly, but not exclusively to automatically tuning speech enhancement systems. Some disclosed methods can tune such parameters across a relatively wider range of impaired speech signals much more quickly and, at least potentially, more accurately, as compared to conventional manual tuning approaches. As an example, some disclosed technologies pertain to speech enhancement, for example, in a distant-talking situation, e.g., where the near-end speech-to-echo ratio (SER) is low, e.g., between about −35 dB and about −15 dB, such as between about −30 dB and about −20 dB, with between about −28 dB and about −22 dB being but one particular SER range. More particularly, but not exclusively, this disclosure presents robust front-end active speech recognition (ASR) solutions. To demonstrate the robustness and quality of disclosed ASR techniques, an embodiment of disclosed techniques is described for a single-microphone, limited-vocabulary system during continuous monaural music playback, which is a particularly challenging problem. Nonetheless, disclosed techniques are applicable to multichannel audio systems, and systems having a plurality of microphones. In contrast to previous works, a single-microphone can be placed very close to the loudspeakers, thus making the ratio between the energy of the uttered command and the music playback, near-end speech to echo ratio (SER), very low. Even with a low SER, disclosed techniques can resolve uttered commands and enable speech control of devices.

Some disclosed methods and systems address distant-talking speech interaction for remote control of a music playback device, providing a natural interation with the device using a plurality of commands. The device can be a portable speaker with a close proximity among four loudspeakers and one microphone where talkers are assumed to be within about two meters of the device. In some instances, a speech-to-echo ratio can be as low as about −30 dB. A speech enhancement approach can combine robust methods for echo cancellation, double talk detection, and noise suppression, and an adaptive quasi-binary mask, well suited for recognition purposes. System parameters can be optimized using a large scale nonlinear programming formulation in which a recognition probability is maximized, and corresponding optimal values of different system parameters can be found with a genetic algorithm. Disclosed methods were validated by testing over the TIMIT database for different music playback and noise types.

Media devices are disclosed. Such a media device can include a loudspeaker, a microphone, and a digital signal processor. The media device, and in some instances the digital signal processor, can include an echo canceller, a noise suppressor, and a speech recognizer. The speech recognizer can be arranged to receive a processed input signal from the noise suppressor.

Some echo cancellers are arranged to receive an input signal from the microphone and to receive a reference signal, e.g., a signal supplied to the loudspeaker. Such an echo canceller can be configured to subtract one or more linear components of the reference signal from the input signal.

Some noise suppressors are configured to suppress non-linear effects of the reference signal in the input signal. For example, a noise suppressor can provide such suppression on a frequency-by-frequency basis. A degree of suppression provided by the noise suppressor for each frequency can correspond to an estimate of residual echo remaining after the one or more linear components of the reference signal have been subtracted from the input signal, to an estimated double-talk probability, and/or to an estimated signal-to-noise ratio of near-end speech in the input signal for each respective frequency.

Some noise suppressors can suppress non-linear effects of the reference signal in the input signal based on selected values of a large number of selectable parameters. For example, an estimate of residual echo, an estimate of double-talk probability and an estimate signal-to-noise ratio can correspond to at least 20 different tunable parameters. Some noise suppressors include between about 10 tunable parameters and about 100 tunable parameters, with between about 20 tunable parameters and about 50 tunable parameters being a particular exemplary range. Values for such large numbers of selectable (or "tunable") parameters can be selected using automate techniques as disclosed herein. Given the combinatorial nature of tuning, previous, manual tuning techniques could not provide the degree of parameter refinement possible using techniques as disclosed herein.

Some noise suppressors apply a spectral gain or a binary mask to the input signal in correspondence with the estimated signal-to-noise ratio of near-end speech in the input signal. Some noise suppressors apply a selected one of a spectral gain and a binary mask to the input signal responsive to the estimated signal-to-noise ratio of near-end speech in the input signal exceeding a predefined signal-to-noise threshold. In other instances, such noise suppressors apply a selected one of a spectral gain and a binary mask to the input signal responsive to the estimated signal-to-noise ratio of near-end speech in the input signal falling below a predefined signal-to-noise threshold. In some instances, the spectral gain or the binary mask applied to the input signal can be applied to the input signal in relation to a selected first frequency, and a different spectral gain (or binary mask) can be applied to the input signal in relation to a different frequency, e.g., to provide frequency-by-frequency noise suppression.

Tangible, non-transitory computer-readable media including instructions that, when executed, cause a computing environment to implement a method pertaining to voice quality enhancement, speech recognition, or both. For example, such instructions can cause a computing environment to subtract linear components of a reference signal from an input signal emitted from a microphone. As well, such instructions can cause the computing environment to estimate one or more of a residual echo remaining in the input signal after the linear components of the reference signal have been subtracted from the input signal, a double-talk probability, and a signal-to-noise ratio of near-end speech in the input signal. Non-linear effects of the reference signal in the input signal can be suppressed on a frequency-by-frequency basis in correspondence with the estimated one or more of the estimated residual echo, the estimated double-talk probability, and the estimated signal-to-noise ratio for each respective frequency. As well, the instructions can cause the computing environment to recognize near-end speech in the input signal after non-linear effects of the reference signal have been suppressed in the input signal.

The act of estimating the double-talk probability can include comparing an estimated echo signal to the input signal from the microphone, on a frequency-by-frequency basis. The act of estimating residual echo can include determining a coherence of the input signal to a signal representative of the reference signal when the double-talk probability exceeds a selected threshold probability in some embodiments, or falls below a selected threshold probability in other embodiments.

In some embodiments, the act of suppressing non-linear effects of the reference signal in the input signal includes applying a spectral gain or a binary mask to the input signal in correspondence with the estimated signal-to-noise ratio of near-end speech in the input signal, on a frequency-by-frequency basis. For example, a selected one of a spectral gain and a binary mask can be applied to the input signal responsive to an estimated signal-to-noise ratio of near-end speech in the input signal exceeding a predefined signal-to-noise threshold. In other examples, the selected spectral gain or binary mask can be applied to the input signal responsive to the estimated signal-to-noise ratio of near-end speech in the input signal falling below a predefined signal-to-noise ratio. A unique spectral gain or binary mask can be selectively applied to each of a variety of frequencies (or frequency bins).

The foregoing and other features and advantages will become more apparent from the following detailed description, which proceeds with reference to the accompanying drawings.

BRIEF DESCRIPTION OF THE DRAWINGS

Unless specified otherwise, the accompanying drawings illustrate aspects of the innovative subject matter described herein. Referring to the drawings, wherein like numerals refer to like parts throughout the several views and this specification, several embodiments of presently disclosed principles are illustrated by way of example, and not by way of limitation, wherein.

DETAILED DESCRIPTION

Figure 1:
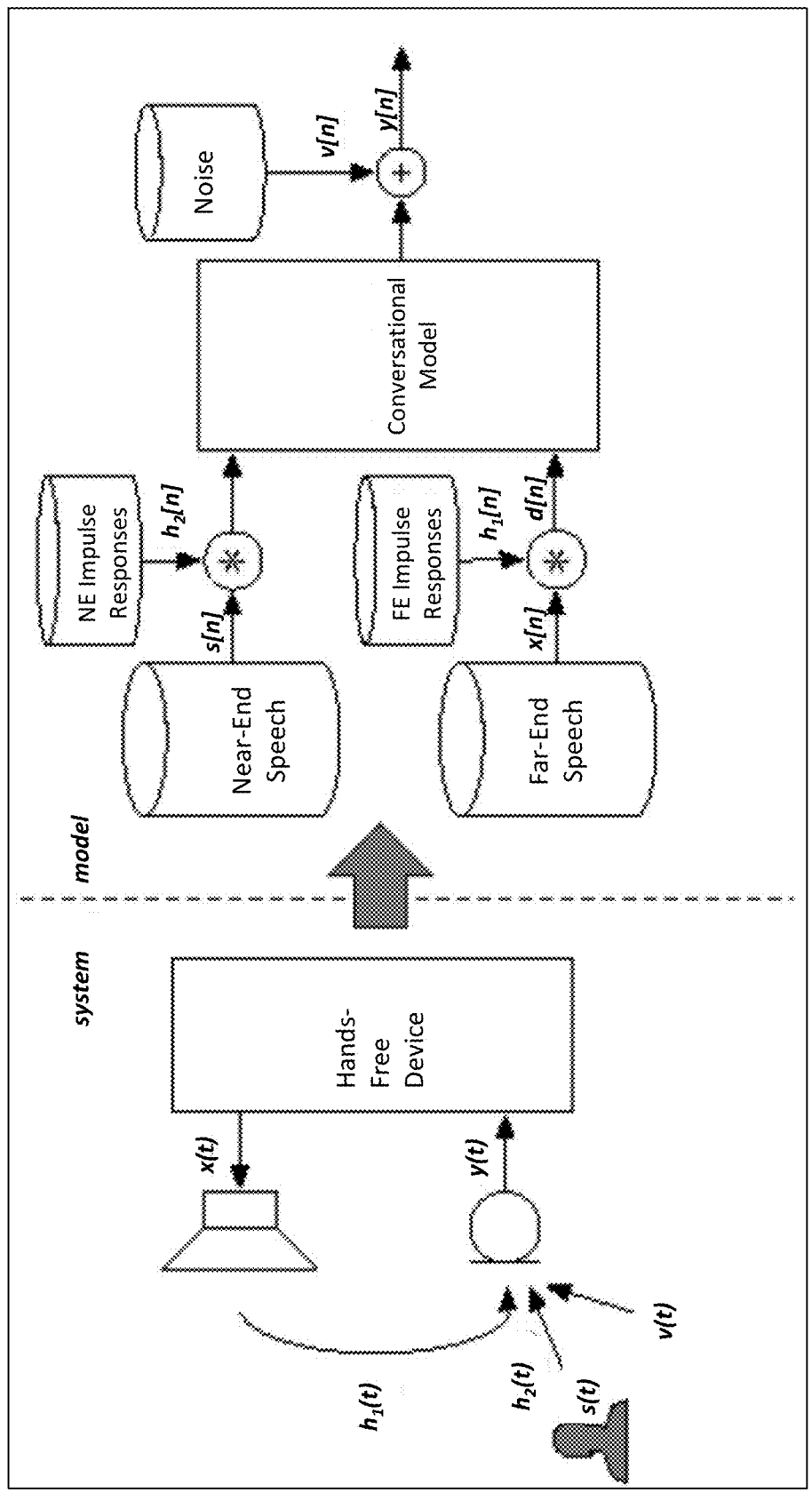
FIG. 1 shows a schematic illustration of a typical hands-free communication system, together with various acoustic inputs to the microphone, as well as a schematic illustration of but one possible model of such a communication system.

The following describes various innovative principles related to signal processing by way of reference to specific examples of techniques for cancelling acoustic echo, enhancing speech, and/or recognizing speech, particularly but not exclusively in instances with low speech-to-echo ratio (SER), and systems related to such techniques. More particularly but not exclusively, disclosed subject matter pertains to techniques for filtering acoustic signals in real time, with techniques for controlling music playback devices using uttered commands being but one specific example. Nonetheless, one or more of the disclosed principles can be incorporated in various other filters to achieve any of a variety of corresponding system characteristics. Techniques and systems described in relation to particular configurations, applications, or uses, are merely examples of techniques and systems incorporating one or more of the innovative principles disclosed herein and are used to illustrate one or more innovative aspects of the disclosed principles.

Thus, speech enhancement and speech recognition techniques (and associated systems) having attributes that are different from those specific examples discussed herein can embody one or more of the innovative principles, and can be used in applications not described herein in detail, for example, in "hands-free" automobile communication systems, in aviation communication systems, in conference room speaker phones, in auditorium sound systems, in hand-held or other gaming consoles, home theater systems, etc. Accordingly, such alternative embodiments also fall within the scope of this disclosure.

Section 1

Overview

The tuning problem in SE systems is often overlooked in the literature and very little work has been done to formalize this procedure. This is, arguably, due to the intrinsic combinatorial nature of the tuning problem and the related optimization criterion which relates to the fuzzy concept of perceptually better quality. An approach to get around the subjective and combinatorial nature of the design and tuning problem is to consider a component of the speech enhancer at the time and find locally optimal and near-optimal solution to the problem by approximating the concept of perceived quality with an approach that is easier to describe mathematically, e.g., the mean squared error (MSE) or maximum likelihood (ML). However, it is well known that such types of measure, as well as the assumptions behind them, are hardly related to the auditory system or user-perceived sound quality. This makes the tuning solution based on such conventional measures necessarily suboptimal from a user-perception standpoint.

The mean opinion score (MOS) measure is the current standardize measure which ranks the degradation of a speech enhancement system compared to a high quality fixed reference from "inaudible" to "very annoying" on a five-point scale. This score can be calculated using automated techniques that mimic the human hearing process. Another measure is the Perceptual Evaluation of the Speech Quality (PESQ). However, given its limited scope to speech codecs evaluation, a new model called Perceptual Objective Listening Quality Assessment (POLQA) was developed. POLQA addresses many of the issues and limitations of PESQ and can produce reliable scores for evaluating speech enhancement output (e.g., filtered speech signals).

A desirable aspect to a developing effective speech enhancement systems is to have a good amount of data on which to reliably test the systems. Recent work has focused on providing a common framework for some of the problems related to speech enhancement, e.g., noise suppression and dereverberation, however, to the inventors' knowledge, there are currently no databases for evaluating speech enhancement techniques and related systems in full-duplex communications, which is often the end goal of real-world systems. Thus, conventional evaluation files are often "handmade" and, commonly, tailored over few, arguably unrealistic scenarios.

According to one aspect of the present disclosure, a formal procedure for tuning a plurality of parameters of a selected speech enhancement system is disclosed. As but one particular example for illustrating disclosed tuning principles, a speech enhancement system suitable for hands-free communication devices is selected for tuning, though other speech-enhancement system configurations can be tuned using principles disclosed herein.

For purposes of illustration, the exemplary system comprises an acoustic echo canceler (AEC), residual echo power estimator (RPE), noise power estimator (NPE), residual echo suppressor (RES), and noise suppressor (NS). Other suitable systems can include one or more of the foregoing acoustic enhancers, and/or one or more of a microphone array beamformer, a blind-source separation system, an artificial bandwidth extension system, a dereverberation system, and a packet-loss concealment system. The tuning problem can be cast as an optimization problem where the cost function is an objective measure of perceived speech quality, and the optimization variables are the parameters of the speech enhancement system.

A nonlinear program is presented to determine a global solution to the optimization problem.

According to another aspect of the present disclosure, a large multi-condition database can be automatically generated by considering characteristics of human conversational speech. Such a database can encompass different key factors including room impulse responses (RIRs), noise types, speakers, and echo return losses (ERLs) and signal-to-noise ratios (SNRs), to model a real full-duplex communication scenario, as shown in FIG. 1. In addition (or alternative) to the foregoing types of acoustic impairments, such a database can encompass other impairments, for example, reverberation nonlinearities, loudspeaker nonlinearities, and other typical distortions found in full-duplex communication. For validation purposes, a plurality of objective measures of perceived speech quality were used as optimization criteria and the filtered speech results were compared using a subjective listening test.

According to yet another aspect of the present disclosure, parameters of a speech enhancement (SE) system can be determined to maximize the SE system's performance when constrained according to computational costs imposed by one or more selected target platforms.

In Section 2, the different components of one exemplary speech enhancement system are presented and the tuning parameters outlined. In Section 3, we formalize tuning as an optimization problem and we present a minimization technique proposed to find a global solution. In Section 4, we define a method to generate a large scale database to design and test our illustrative speech enhancer embodiment. In Section 5, we present results in terms of objective and subjective quality testing for different optimization criteria. In Section 6, we present observations relating to perceptual objective based tuning and methodology design, suggest future directions for perceptual objective based tuning and methodology design and review approaches for automatically tuning SE systems. In Section 7, we present several components of an example of an SE system along with several corresponding parameters. In Section 8, we introduce a constrained optimization framework and a related technique used to tune the exemplary SE system. In Section 9, we give a thorough explanation of the experimental setup and present the results of the computationally constrained optimization for several different scenarios considered. In Section 10, we describe computing environments suitable for implementing disclosed techniques, and in Section 11 we describe alternative embodiments of disclosed innovations.

Section 2

Speech Enhancement Methods

Figure 2:
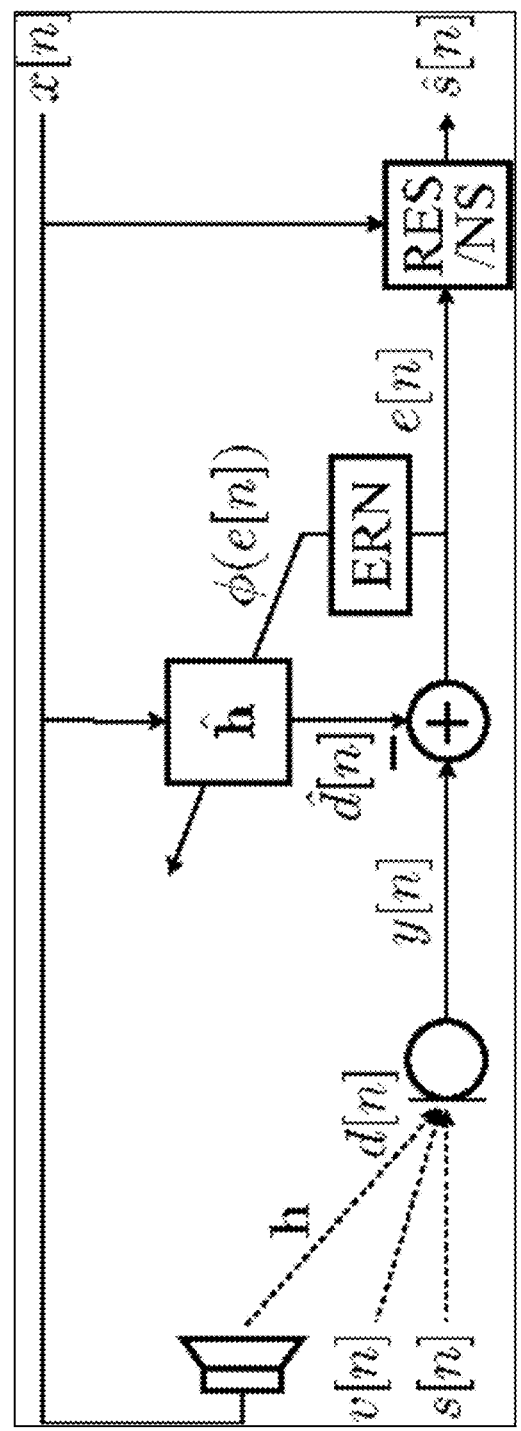
FIG. 2 shows a block diagram of one particular example of many possible speech enhancement systems of the type disclosed herein.
Figure 3:
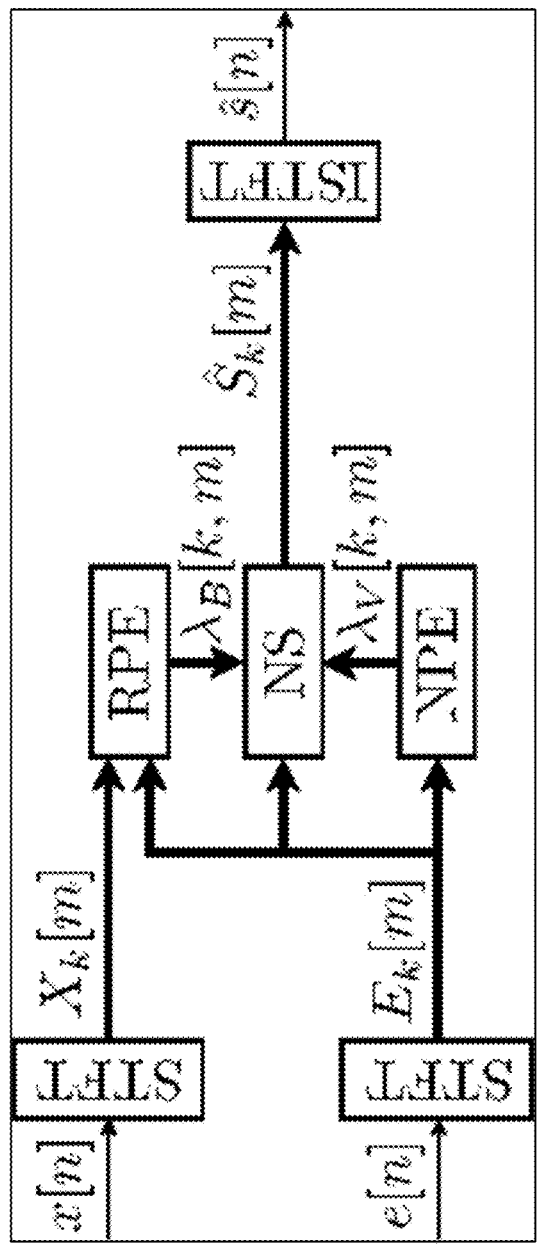
FIG. 3 shows a block diagram of a residual echo and noise suppressor in the exemplary speech enhancement system shown in FIG. 2.

Let y[n] be the near-end microphone signal, which consists of the near-end speech s[n] and noise v[n] mixed with the acoustic echo d[n]=h[n]*x[n], where h[n] is the impulse response of the system, x[n] is the far-end reference signal, and * is the convolution operator. The overall block diagram of one example of a speech enhancer is shown in FIGS. 2 and 3. The exemplary enhancer has an acoustic echo canceler (AEC), a residual echo power estimator (RPE), a noise power estimator (NPE), a residual echo suppressor (RES), and a noise suppressor (NS). Other speech enhancers can have one or more of the foregoing components, and/or one or more of a microphone array beamformer, a blind-source separation system, an artificial bandwidth extension system, a dereverberation system, and a packet-loss concealment system In the exemplary enhancer, the RES and the NS can be combined by using only one NS unit while taking the estimated noise power from both the RPE and the NPE as shown in FIG. 3. The AEC subtracts the linear part of the echo while the RESNS suppresses the nonlinear part of the echo and noise. Due to the modeling mismatch between the estimated room impulse response $\hat{h}$ and the actual room impulse response h, the error signal of the AEC is given by $$e[n]=s[n]+v[n]+b[n], \qquad \text{Equation (1)}$$

where b[n]=d[n]−$\hat{d}$[n] is the true, noise-free, residual echo. Therefore, the output of the AEC can be further enhanced through RESNS, which is usually implemented in the short-time Fourier transform (STFT) domain.

2.1 Robust Acoustic Echo Canceler

Since strong near-end interference may corrupt the error signal of the AEC and cause the adaptive filter to diverge, a robust acoustic echo canceler (RAEC) system can be used, where the error recovery nonlinearity (ERN), batch iterative adaptation, and the noise-robust adaptive step-size are used to allow for continuous update of the adaptive filter without the use of a double-talk detector to freeze the adaptation. To reduce the delay of the frequency-domain adaptive filter, the multi-delay adaptive filter structure can be used, as but one example.

2.2 Residual Echo Power Estimator

A coherence based method can be used for the RPE. The residual echo is modeled as (omitting the frame index m whenever necessary for simplicity)

$$B_k = \Delta H_k^T X_k, \qquad \text{Equation (2)}$$

where $\Delta H_k = [\Delta H_k[0], \ldots, \Delta H_k[M_{RPE}-1]]^T$ (system distance in the STFT domain) and $X_k = [X_k[m], \ldots, X_k[m-M_{RPE}+1]]^T$ for the $k^{th}$ frequency bin. The system distance can be estimated using a minimum mean-square error (MMSE) approach:

$$\Delta \hat{H}_k = E\{X_k^* X_k^T\}^{-1} E\{X_k^* B_k\} = \Phi_{XX}^{-1}[k]\Phi_{XB}[k]. \qquad \text{Equation (3)}$$

Using only the diagonal terms of the autocorreltion matrix $\Phi_{XX}$ the error signal E in place of the true residual echo B, the residual echo power is estimated by $$\lambda_B[k] = \left| \frac{\hat{\Phi}_{XE}^T[k]X_k}{\hat{\Phi}_{XX}[k]} \right|^2, \qquad \text{Equation (4)}$$

where $$\hat{\Phi}_{XE}[k,m] = \alpha_{RPE}\hat{\Phi}_{XE}[k,m-1] + (1-\alpha_{RPE})X_k^* E_k, \qquad \text{Equation (5)}$$

$$\hat{\Phi}_{XX}[k,m] = \alpha_{RPE}\hat{\Phi}_{XX}[k,m-1] + (1-\alpha_{RPE})|X_k|^2. \qquad \text{Equation (6)}$$

2.3 Noise Power Estimator

A low complexity MMSE noise power estimator that implicitly accounts for the speech presence probability (SPP) is used for the NPE. The MMSE estimation of a noisy periodogram under speech presence uncertainty results in $$E\{\lambda_V[k]|E_k\}=P(H_1|E_k)\lambda_V[k]+P(H_0|E_k)|E_k|^2, \qquad \text{Equation (7)}$$

where the a posteriori SPP is calculated by $$P(H_1|E_k) = \left[1 + (1+\xi_{H_1})\exp\left(-\frac{|E_k|^2}{\lambda_V[k,m-1]}\frac{\xi_{H_1}}{1+\xi_{H_1}}\right)\right]^{-1}. \qquad \text{Equation (8)}$$

The noise power spectral density is then updated by $$\lambda_V[k,m]=\alpha_{NPE}\lambda_V[k,m-1]+(1-\alpha_{NPE})E\{\lambda_V[k]|E_k\}. \qquad \text{Equation (9)}$$

To avoid stagnation due to an underestimated noise power, a smoothing is performed $$\overline{P}=\alpha_P \overline{P}+(1-\alpha_P)P(H_1|E_k), \qquad \text{Equation (10)}$$

and the following ad-hoc procedure is used for the update:

$$P(H_1|E_k) = \begin{cases} \min\{P(H_1|E_k), P_{TH}\}, & \overline{P} > P_{TH}, \\ P(H_1|E_k), & \text{otherwise.} \end{cases} \qquad \text{Equation (11)}$$

2.4 Noise Suppressor

The Ephraim and Malah log-spectral amplitude (LSA) MMSE estimator can be used for the NS:

$$G_k^{LSA} = \frac{\xi_k}{1+\xi_k}\exp\left(\frac{1}{2}\int_{\frac{\xi_k \gamma_k}{1+\xi_k}}^{\infty} \frac{e^{-t}}{t}dt\right), \qquad \text{Equation (12)}$$

where the a priori SNR $\xi_k$ and the a posteriori SNR $\gamma_k$ are $$\xi_k = \frac{E\{|S_k|^2\}}{E\{|V_k|^2\}+E\{|B_k|^2\}} = \frac{\lambda_S[k]}{\lambda_V[k]+\lambda_B[k]}, \qquad \text{Equation (13)}$$

$$\gamma_k = \frac{E\{|E_k|^2\}}{E\{|V_k|^2\}+E\{|B_k|^2\}} = \frac{\lambda_E[k]}{\lambda_V[k]+\lambda_B[k]}. \qquad \text{Equation (14)}$$

The estimation of the a priori SNR is done, by way of example, using the decision-directed (DD) approach:

$$\xi_k^{DD} = \alpha_{DD}\frac{|\hat{S}_k[m-1]|^2}{\lambda_V[k,m]+\lambda_B[k,m]} + (1-\alpha_{DD})\max\{\gamma_k-1,0\}. \qquad \text{Equation (15)}$$

To further reduce the musical noise, the suppression gain is limited to a certain minimum value $$\hat{S}_k = [(1-G_{min})G_k^{LSA}+G_{min}]E_k. \qquad \text{Equation (16)}$$

Section 3

Tuning as an Optimization Problem

3.1 Cost Function

A general mathematical optimization problem has the form $$\text{minimize } D(p)$$

$$\text{subject to } L_i \leq f_i(p) \leq U_i, \; i=1,\ldots,C. \quad \text{Equation (17)}$$

Here the vector $p=\{p_1, p_2, \ldots, p_N\} \in R^N$ is the optimization variable of the problem, the function $D(\bullet): R^N \to R$ is the objective function, the functions $f_i(\bullet): R^N \to R$ are the $C$ inequality constraint functions, and the pair of constants $\{U_i, L_i\}$ are the limits, or bounds, for the constraints.

The tuning problem can be easily formalized as the above optimization problem. In this case, the objective function to maximize is the speech quality, or MOS, produced by the speech enhancement system. Since most are full-reference measures, they will be calculated when compared to the clean speech signal. The measure in this case is the increase in quality, or ΔMOS, and will be calculated as follows:

$$\Delta MOS(\hat{s}[n], y[n]) = MOS(\hat{s}[n], s[n]) MOS(y[n], s[n]),$$

where $y[n]$, $s[n]$, and $\hat{s}[n]$ are the signals considered in Section 2. We can reasonably assume that inequality constraint functions are linear and univariate, thus the constraints simplify to determine lower and upper bounds limit for the components of the solution vector. Our optimization problem then becomes:

$$\text{maximize } \Delta MOS(\hat{s}[n,p], s[n])$$

$$\text{subject to } U \leq p \leq L. \quad \text{Equation (18)}$$

where $p$ is now the vector of the parameters that need tuning, $\hat{s}[n,p]$ is the speech enhancement system output obtained with these parameters, and L and U represent, respectively, lower and upper bounds for the values each variable. While not strictly necessary, explicitly defining these bounds in our formulation allows us to obtain faster and more reliable solutions.

3.2 Optimization Methods

Since the objective function is not linear and not known to be convex, there are no effective methods for solving Equation (18). Performing a brute force search with as few as ten variables can be extremely challenging, while problems with a few hundreds of variables can be intractable. Methods for the general nonlinear programming problem therefore take several different approaches, each of which involves some compromise. So-called Genetic Algorithms (GA) have been successfully applied to this type of non-convex mixed-integer optimization. Various steps of a GA methodology are outlined below.

Step 1—An initial population of values $\Pi^{(0)}=\{p_m^{(0)}, m=1,\ldots,M\}$, where $M$ is the number of possible value sets in a single generation, is generated randomly with a uniform distribution over the space of feasible values [L,U]:

$$p_m^{(0)} : \cup(L,U). \quad \text{Equation (19)}$$

The terms L and U can be determined through a preliminary analysis based on an educated guess done by observing the function's behavior during the method's implementation phase.

Step 2—The cost function in Equation (18) is evaluated for each set of values at the $k$ th generation, $\Pi^{(0)}=\{p_m^{(0)}, m=1,\ldots,M\}$, and the best N sets are migrated to the next generation $\Pi^{(k+1)}$. The remaining M–N sets of values of $\Pi^{(k+1)}$ are generated from $\Pi^{(k)}$ either through crossover ($p_c$) or mutation ($p_m=1-p_c$).

The sets that go through crossover/mutation are chosen in a series of tournament selections: a random set of ω parameter sets is extracted from the population, $\Omega \subset \Pi^{(k)}$, and the set $p_m^{(k)} \in \Omega$ with the best $\Delta MOS(\hat{s}[n,p_m^{(k)}], y[n])$ is then selected.

Crossover—Given two sets of parameters from a previous generation $p_n^{(k)}, p_l^{(k)} \in \Pi^{(k)}$, a good but not optimum value of their cost function may be due to the fact that both sets approximate well some but not all parameters $p$. However, as the function $\hat{v}[n,p]$ is not invertible, we are unable to determine which parameters have a good/bad match. As a consequence, the crossover function Φ makes a random weighted mean of the two set of parameters $$p_m^{(k+1)} = \Phi(p_n^{(k)}, p_l^{(k)}) = \beta e p_n^{(k)} + (1-\beta) e p_l^{(k)} \quad \text{Equation (20)}$$

where $\beta : \cup(0,1)$ and $e$ denotes element-wise multiplication.

Mutation—The mutation $p_m^{(k+1)} = \Psi(p_n^{(k)})$ of the set of values has the objective of) prevent falling of all elements in the population to a local minimum. Different heuristic approaches can be used to design a mutation function and are often associated to the type of problem. Given that strategies like variable value swapping and other nonlinearities do not really apply to our case, we will use two of the most common types of perturbations. The Uniform perturbation replaces the value of a chosen element with a uniform random value selected between the upper and lower bounds for that element. The Gaussian perturbation adds a unit Gaussian distributed random value a chosen vector element. If the value falls outside of the user-specified lower or upper bounds for that element, the value is clipped.

Step 3—The Step 2 is repeated until a halting criterion is reached, e.g., the best cost function does not changes for $\Delta k$ generations or a prescribed number of generations is reached. The set of parameters $p_m^{(K)} \in \Pi^{(K)}$ with the largest value of the cost function will provide our estimate:

$$p = \underset{p_m^{(K)} \in \Pi^{(K)}}{\operatorname{argmax}} \Delta MOS(\hat{s}[n, p_m^{(K)}], y[n]) \quad \text{Equation (21)}$$

Section 4

Database Generation

Several studies address the characteristics of human conversational speech, including the importance on understanding and quantifying them, e.g., for optimizing and guiding the design of conventional echo cancelers. The ITU-T P.59 Recommendation is a good starting point to understand and define the so-called "conversational events": talk-spurt, pause, mutual silence, and double-talk. The methodology to generate speech presented in is rather simple and relies on hand-coded expert knowledge, thus it does not lend itself easily to automatic generation of conversation speech. In order to generate a large database, we need a more effective method.

Conventional methodologies are focused on human-machine turn-taking with very little mutual social interaction. We therefore propose a flexible model of conversational behavior using a 4-stated Markov chain model where state corresponds to, respectively, mutual silence (MS), near-end talk (NE), far-end talk (FE), and double-talk (DT), defining all the possible combination of the components of y[n], as described in Section 2.

Figure 4:
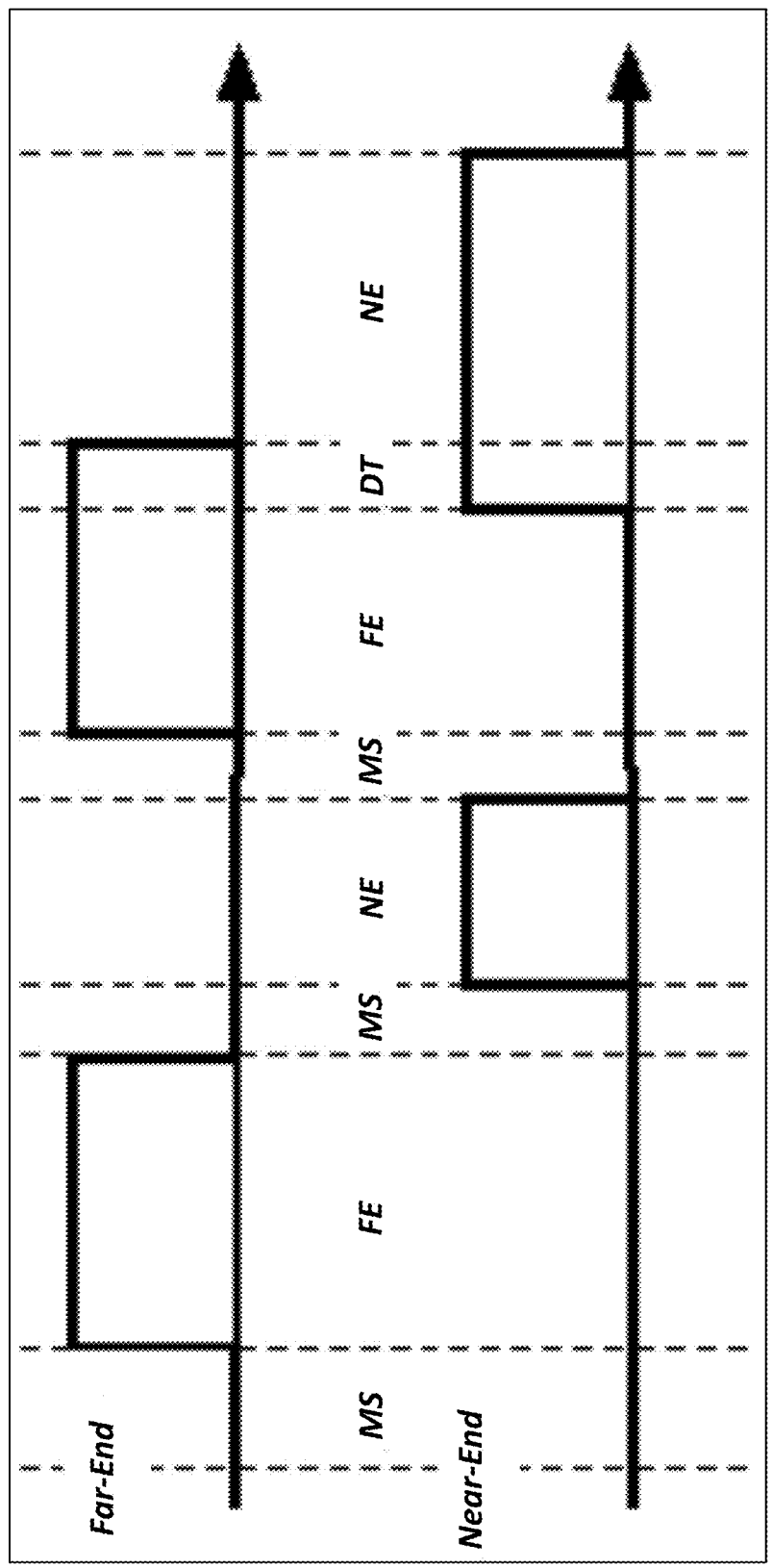
FIG. 4 shows an exemplary sequence of speech states in one example of conversational speech.

The Markov chain model is uniquely described by its transition matrix T to model the generation model and the related distributions of the conversational events. According to the distribution of the single talk duration $T_{ST}$, double talk duration $T_{DT}$, and mutual silence duration $T_{MS}$, we are able to use a Markov chain Monte Carlo (MCMC) sampling technique to find the transition matrix T of a 4-state Markov chain. An example of the sequence to be modeled is shown in FIG. 4.

In the example discussed herein, the following constraints were imposed on the Markov chain:
- transitions from NE to FE and FE to NE are not allowed;
- transitions from MS to DT and DT to MS are not allowed;
- the transition probabilities of going from MS to NE and MS to FE are equivalent.

Figure 5:
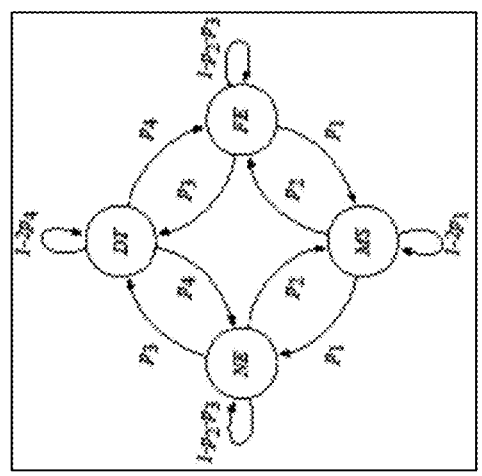
FIG. 5 shows a schematic illustration of an example of a Markov chain showing four possible conversational states, available transitions among the states, and associated probabilities for such transitions. The illustrated Markov chain (or others) can be used to generate artificial conversational speech.

The Markov chain obtained is represented in FIG. 5 and its transition matrix can be expressed as follows:

$$T = \begin{bmatrix} 1-2p_1 & p_1 & p_1 & 0 \\ p_2 & 1-p_3-p_2 & 0 & p_3 \\ p_2 & 0 & 1-p_3-p_2 & p_3 \\ 0 & p_4 & p_4 & 1-2p_4 \end{bmatrix}. \quad \text{Equation (22)}$$

Thus, the model is represented by only four parameters. This makes it very easy to modify to fit different types of conversation scenarios with different levels of interactivity.

The NE and FE speech databases shown in FIG. 1 can be composed by continuous speech with no pauses as the conversational model will handle the creation of the conversational events.

Section 5

Experimental Analysis

The optimization framework presented in Section 3 was used to tune and evaluate the speech enhancement technique presented in Section 2. Here we provide details for the method proposed and the results obtained.

5.1 Setup

The speech databases were generated using the ITU-T P-Series test signals. This set includes 16 recorded sentences in each of 20 languages and sentences recorded in the anechoic environment, sampled at 16 kHz. From these, we generated two single-channel signal, NE and FE, with continuous activity (i.e. without pauses). The total duration of the speech data is about one hour per channel. The NE (near end) and FE (far end) speech segments were generated using the Markov chain presented in Section 4 with $p_1=0.04$, $p_2=0.03$, $p_3=0.05$, $p_4=0.25$, generating the same statistical behavior of conversational events as specified above.

A noise database was used which included babble (e.g., airport, cafeteria, exhibition, and restaurant) noise, white and pink noise, impulsive noise (e.g., hammering), airplane cabin noise, car noise from a variety of car models, and street noise.

The room impulse responses were calculated in real environments using the Audio Precision APx525 log-swept chirp signal through the Beats by Dr. Dre Pill Portable Speaker and truncated to the desired length ($f_s=48$ kHz, resampled at 16 kHz). The average $RT_{60}$ was 0.28 s.

In order to generate the NE and FE segments, a starting and ending point were chosen randomly within the NE and FE channels. The 1000 generated segments were between 6 to 8 seconds in length, taken generally to be ideal for objective quality measures. The two segments were then normalized to −26 dBov to avoid clipping, following the ITU-T Recommendation P.835, and convolved with their respective impulse response with normalized unitary energy. The microphone signal was created as follows. The NE signal was mixed with the FE signal at a Signal to Echo Ratio (SER) uniformly distributed between −30 and 5 dB. The scaling was done by calculating the energy of the signals. The noise was then mixed at a SNR uniformly distributed between −5 to 10 dB, according to the noise RMS and the mixed speech signal energy.

Considering the speech enhancement techniques presented in Section 2 and the problem in Equation (18), we define the parameter vector as $$p = \{M_{AEC}, N_{AEC}, \mu_{AEC}, \alpha_{AEC}, M_{RPE}, \alpha_{RPE} \xi_{H_1}, P_{TH}, \alpha_P, \alpha_{NPE}, \alpha_{DD}, G_{min}\}, \quad \text{Equation (23)}$$

and empirically determine reasonable upper and lower bounds for each variable. The genetic algorithm had a population of M=20 possible candidates. The best N=4 were migrated to the next generation. Of the remaining sets, half went through crossover and half went through mutation (Uniform mutation was chosen). The perceptual objective quality measures used were PESQ, POLQA, and the recently introduced ViSQOL. For reference purposes, we include the manually tuned reference where the parameters were set during design of the speech enhancer.

The tuning parameters discussed above are frequency independent, i.e. the same parameter is used for all frequency bins as an example used for clarity. However, the tuning parameters can be expanded such that for each frequency bin there is a frequency-bin dependent tuning parameter. For frequency-bin-dependent tuning, the tuning parameters become $$p = \{M_{AEC}, N_{AEC}, \mu_{AEC}, \alpha_{AEC}, M_{RPE}, \alpha_{RPE} \xi_{H_1}, P_{TH}, \alpha_P, \alpha_{NPE}, \alpha_{DD}, G_{min}\}, \mu_{AEC} = [\mu_{AEC}[0], \ldots, \mu_{AEC}[K-1]]^T$$

where μ is a vector of parameters, one or more (or all) of which is frequency dependent, for example. Solutions for the various frequency-dependent tuning parameters can be reached in accordance with approaches discussed above.

5.2 Results

We obtained four sets of parameters: $p_{POLQA}$, $p_{PESQ}$, and $p_{ViSQOL}$, and $p_{MANUAL}$. For comparison, we include four other objective measures that do not account for perceptual measures, Log-Spectral Distortion (LSD), true Echo Return Loss Enhancement (Echo Gain), Mean Square Error (MSE), and a combined measure where the AEC block is optimized using tERLE and the RPE, NPE, and NS blocks are optimized with LSD (with fixed AEC parameters). These will be $p_{LSD}$, $p_{MSE}$, and $p_{tERLE}$, and $p_{tERLE+LSD}$. We divide the database in two parts, 80% is used to estimate the parameters, 20% is used for testing. The results in terms of ΔMOS calculated using PESQ, POLQA, and ViSQOL are shown in Table 1. The results show a net improvement in MOS over the manually tuned method, which, in turn, outperforms all the objective measures. This proves that, in general, a trained ear is much better at determining proper values for the various parameters than objective approaches, even if the testing is done on a limited set. However, the strength of large-scale optimization and the reliability of perceptual measures like POLQA, increases greatly the performance of the approach with a ΔMOS POLQA, arguably the most reliable objective measure for speech enhancement performance evaluation, increase of 0.35. The PESQ and ViSQOL measures, even in different ratios, agree with the POLQA-based evaluation. The rest of the results agree with the intuition, with measures like tERLE and LSD, and the combination of the two, outperforming MSE. All the perceptual measures give good performance, curiously $p_{POLQA}$ achieves slightly better results than n $p_{ViSQOL}$ in terms of ΔMOS ViSQOL, this means that the optimal solution in the ViSQOL optimization was not optimal in the testing scenario.

TABLE 1

Comparison between the objective improvements in MOS calculated with POLQA, PESQ, and ViSQOL obtained with different sets of parameters calculated with different criteria. A 95% confidence interval is given for each value.

| METHOD | ΔMOS PESQ | ΔMOS POLQA | ΔMOS ViSQOL |
|---|---|---|---|
| $p_{POLQA}$ | .455 ± .021 | .654 ± .042 | .387 ± .021 |
| $p_{PESQ}$ | .475 ± .035 | .442 ± .050 | .342 ± .053 |
| $p_{ViSQOL}$ | .358 ± .028 | .487 ± .450 | .369 ± .032 |
| $p_{MANUAL}$ | .276 ± .083 | .296 ± .121 | .201 ± .089 |
| $p_{LSD}$ | .139 ± .042 | .221 ± .046 | .154 ± .043 |
| $p_{tERLE}$ | .147 ± .053 | .234 ± .067 | .121 ± .025 |
| $p_{tERLE+LSD}$ | .194 ± .061 | .246 ± .049 | .173 ± .082 |
| $p_{MSE}$ | .138 ± .089 | .179 ± .134 | .104 ± .091 |

Section 6

Summary of Speech Enhancement Systems

We have presented a methodology to tune the parameters of different components of a speech enhancer. The values of the parameters can often be chosen empirically in the deployment stage of the enhancer design, thus they are likely suboptimal. We have proven that optimizing over an objective criterion that embeds aspect of human perception seems to work reasonably well in determining better solutions to the tuning problem. In particular, a subjective test showed a fairly significant preference over a system manually tuned. Furthermore, using standardized objective quality measures like PESQ and POLQA, we have seen a net increase in MOS, usually not easily obtained without significant methodology changes. In order to perform the large scale optimization, we implemented one example of a method to determine a database for full-duplex communication which creates realistic communication scenarios. The methodology presented can be a first step toward a more elegant way to handle the tuning problem, helping in the deployment process as well as suggesting shortcomings of the tested technique.

As noted, an aspect of research and development efforts in SE systems design is to integrate different approaches to maximize, or minimize, a given measure which reflects the purpose of the approach. When the SE systems are used in full-duplex speech communications, the perceptual quality of the approach can be maximized, where the mean opinion score (MOS) is one standard measure of perceptual quality. This score can be calculated using automated techniques that mimic the human hearing process. The ITU-T standardized model is a Perceptual Objective Listening Quality Assessment (POLQA), which can produce reliable scores for evaluating SE approaches and can overcome several limitations of predecessor objective measures of perceived sound quality, e.g, the Perceptual Evaluation of Speech Quality (PESQ).

When SE systems are used as a pre-processor for automatic speech recognition (ASR), maximizing the accuracy of the recognizer is the target of the design approach. While model-domain enhancement methods have shown to better account for mismatch between training condition and application scenario, methods relying on fixed acoustic models (e.g., Hidden Markov Models, HMMs, defined with Gaussian Mixture Models, GMMs) are still the most common methods for embedded limited-vocabulary applications. Therefore, these methods rely heavily on SE approaches before extracting a set of features for recognition as they need to match the training conditions of the ASR. Accurate ways to asses ASR reliability are still a matter of debate as heavily application and context dependent, however in embedded systems scenarios, the Phone Accuracy Rate (PAR) or, at a higher semantic level, Word Accuracy Rate (WAR) are generally appropriate quality measures.

A commercially viable design and prototyping of a SE system can, and desirably will, take into account the type of platform in which the approach will be deployed. While other type of integrated circuits can be used, e.g., field-programmable gate array (FPGAs), dedicated digital signal processors (DSPs) are the most common choice for audio related applications, generally providing lower-cost solution, with lower latency and lower energy consumption. Meeting the specified requirements of the number of instructions that the DSP can handle, often quoted in MIPS (million instructions per second), is generally a nonnegotiable condition. Determining the computational cost of an approach is done by counting the number of simple mathematical operation, i.e., multiplications and additions, particular arithmetic operations, e.g., multiply-accumulate (MAC), different logic operations (AND, XOR, etc.), as well as the usage of predefined highly-optimized subroutines already embedded in the processor, e.g., the fast Fourier transform (FFT).

The objective of maximizing the perceptual quality or the recognition accuracy often collides with the computational constraints imposed by the platform. While a good practice is to profile each component of a SE system as it is being developed to avoid overly complex solutions, the optimization and tuning of the system is done only at an advanced stage of the development often considering each computational component independently. Furthermore, the optimization of its components is often done by means of measures that are easier to handle mathematically, e.g., the mean squared error (MSE) or log-spectral distortion (LSD), but do not relate well with the real goal of the SE system. The results of this approach are obviously suboptimal.

In our currently pending U.S. Patent Application No. 61/893,147, filed Oct. 18, 2013, and 61/937,522, filed Feb. 8, 2014, we formalized the tuning of a SE system for a full-duplex communications by casting it as an optimization problem where the cost function was a perceptual objective measure and the optimization variables were its parameters. Our currently pending U.S. Patent Application No. 61/973,155, filed Mar. 31, 2014, discloses extensions of that work, including an optimization of a ASR front-end where the imposed cost function is the back-end recognizer accuracy. In those disclosures, the optimization problem was unconstrained. Accordingly, any solution satisfying the maximization of the perceptual objective quality or recognition accuracy satisfied the optimization problem.

Subsequent Sections in this disclosure introduce, by way of example, a penalty function accounting for the computational cost in the optimization problem. A system to be optimized, by way of example, includes several computational blocks. Two large databases of conversation speech that cover a large number of scenarios are derived from the TIMIT database for training and testing. The system is then optimized for the applications scenarios mentioned above: full-duplex communication and ASR front-end.

Section 7

An Example of a Speech Enhancement System

Figure 6:
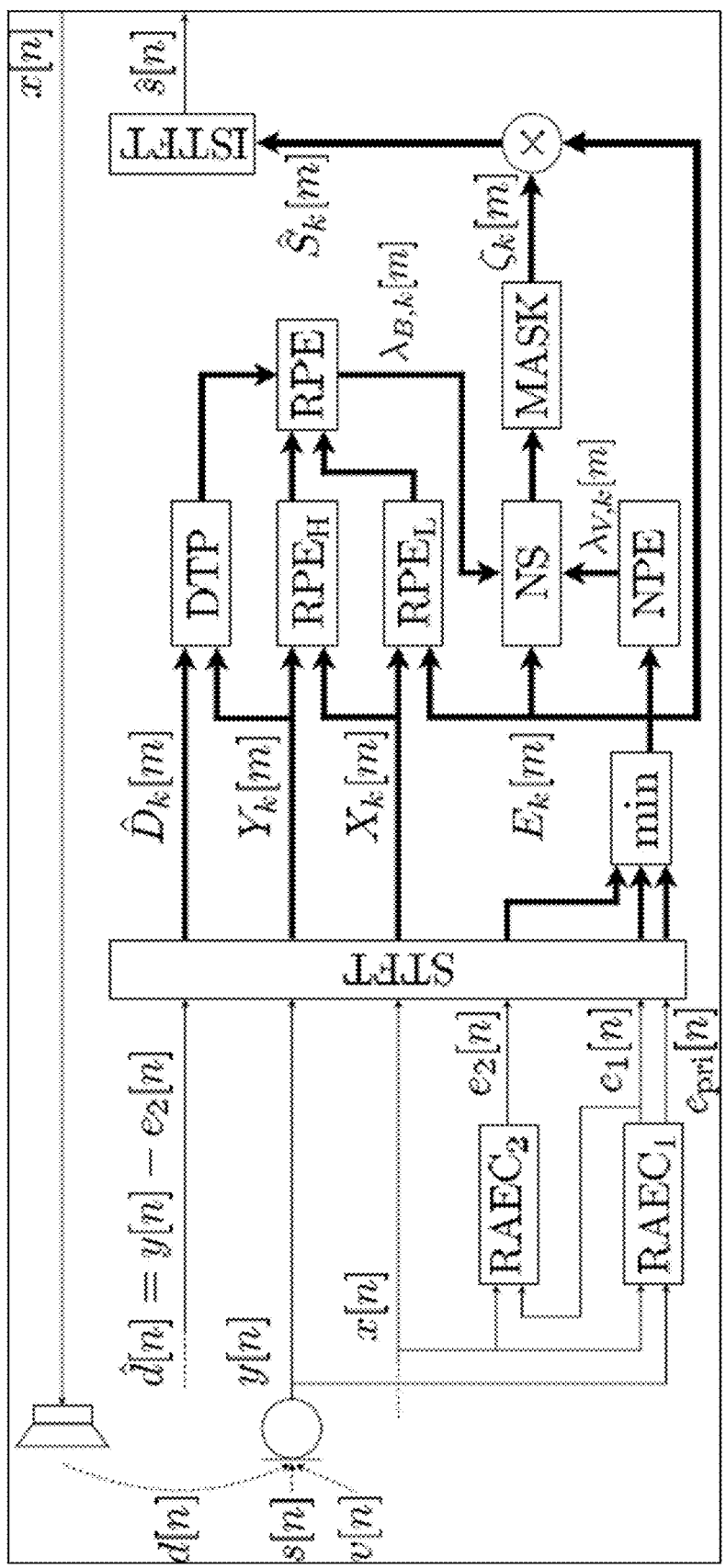
FIG. 6 shows another block diagram of one particular example of many possible speech enhancement systems of the type disclosed herein.

As with the SE system presented in Section 2, above, let y[n] be the near-end microphone signal, which consists of the near-end speech s[n] and noise v[n] mixed with the acoustic echo d[n]=h[n]*x[n], where h[n] is the impulse response of the system, x[n] is the far-end reference signal, and * is the convolution operator. The overall block diagram of one example of a speech enhancement system used for purposes of illustrating presently disclosed constrained optimization techniques is shown in FIG. 6. In particular, the exemplary SE system has two RAEC, a DTP estimator, two RPE, a NPE, and a combined NS and binary mask.

In FIG. 6, $e_{pri}[n]$ represents the error signal before the adaptive filter update, while $e_1[n]$ and $e_2[n]$ are the error signals after the filter update. $\lambda_{V,k}[m]$ and $\lambda_{B,k}[m]$ are respectively the noise power estimate and the residual echo power estimate of the $m^{th}$ frame in the $k^{th}$ frequency bin.

Here we briefly describe the parameters and the computational complexity of the system. The tuning parameters for each of the RAEC include the frame size $N_{RAEC}$, the number of partitioned blocks $M_{RAEC}$, the number of iterations $N_{iter}$, the step-size $\mu_{RAEC}$, the tuning parameter $\gamma_{RAEC}$ for the robust adaptive step-size, and the smoothing factor $\alpha_{RAEC}$ for the power spectral density estimation. The tuning parameters for the DTP consists of the transition probabilities $a_{01}$, $a_{10}$, $b_{01}$, and $b_{10}$, the smoothing factors $\alpha_{DTP}$ and $\beta_{DTP}$, the frequency bin range $[k_{begin}, k_{end}]$, the frame duration $T_{DTP}$, and the adaptation time constants τ. The tuning parameters for the RPE consist of the numbers of partitions $M_{RPE_H}$ and $M_{RPE_L}$ to calculate the coherence and the smoothing factors $\alpha_{RPE_H}$ and $\alpha_{RPE_L}$ for the power spectral density estimation. The tuning parameters of the NPE consist of the fixed a priori SNR $\xi_{H_1}$, the threshold $p_{TH}$, and the smoothing factors $\alpha_P$ and $\alpha_{NPE}$. The tuning parameters of the NS include a smoothing factor for the SNR estimator $\alpha_{DD}$. The tuning parameters for the direct masking include the minimum gain $G_{min}$, the SNR thresholds $\theta_1$ and $\theta_2$, the tuning parameter α, and a binary variable $b_m$ that chooses the type of masking applied.

Table 2 shows the computational complexity per sample for each block, where "mply" stands for multiplication, "add" stands for addition, "sqrt" stands for square root, "if-else" stands for the if-else statement, "div" stands for division, "log" stands for the logarithm function, "exp" stands for the exponential function, "MAC" stands for multiply-accumulation, "cplx" stands for complex number, and "pwrSpectr" stands for the square of the magnitude of a complex number. Eventually, the actual complexity is platform dependent, but each of the fundamental operations such as the FFT can be estimated in terms of DSP cycles, which in turn allows us to estimate the computation on an actual platform in terms of MCPS. Note that $FFT_{RAEC}$ and $FFT_{STFT}$ represent the FFT cost per sample by dividing the FFT cost by its block size. Also note that some of the tuning parameters, such as the number of partitioned blocks $M_{RAEC}$ and $M_{RPE}$, the $2N_{RAFC}$-point FFT of the RAEC, the $N_{STFT}$- point FFT of the STFT block, and the number of iterations $N_{iter}$, will influence directly the complexity. Given the computational complexity of each block, the total computational complexity in terms of MCPS is given by $$C(p) = \\ (C_{RAEC_1} + C_{RAEC_2} + 7C_{STFT} + C_{DTP} + C_{RPE_H} + C_{RPE_L} + \\ C_{NPE} + C_{NS})\frac{f_s}{10^6}[MCPS],$$

Equation (24)

where p is the vector of optimization parameters and $f_s$ is the sampling rate. Additionally, there is an on-off flag to either turn on or off the second RAEC block to determine whether using the cascaded structure of two RAEC blocks or running only one RAEC block for a higher number of iterations is more beneficial.

TABLE 2

The computational complexity per sample for each block.

$C_{RAEC}$ = (3$N_{iter}$ + 2) − $FFT_{RAEC}$ + (5$N_{iter}$ + 3) − mply + (3$N_{iter}$ + 1) − MAC + (2$N_{iter}$ + 1) − cplx − pwrSpectr + (2$N_{iter}$ + 1)$M_{RAEC}$ − cplx − mply + $N_{iter}$ ($M_{RAEC}$ + 1) − add + $N_{iter}$ − Sqrt + 2$N_{iter}$ − div + $N_{iter}$ − if − else + $N_{iter}M_{RAEC}$ − real − cplx − mply
$C_{STFT}$ = 2 − mply + $FFT_{STFT}$
$C_{DTP}$ = 3 − cplx − pwrSpectr + 18 − mply + 12 − MAC + 1 − cplx − mply + 6 − div + 9 − add + 1 − exp +1 − sqrt +1 − log
$C_{RPE}$ = 1 − cplx − pwrSpectr + 4 − mply + 3 − MAC + ($M_{RPE}$ + 1) − cplx − mply + ($M_{RPE}$ + 1) − add + 1 − div
$C_{NPE}$ = 1 − cplx − pwrSpectr + 3 − div + 3 − add + 5 − mply + 1 − exp + 3 − MAC + 2 − if − else
$C_{NS}$ = 2 − cplx − pwrSpectr + 2 − add + 1 − if − else + 3 − mply + 2 − MAC + 3 − div

Section 8

Optimization Framework 8.1 Optimization Problem

The SE system tuning can be formalized mathematically as an optimization problem associateD with an objective function to maximize, depending on the application scenario, under a constraint function accounting for selected implementation requirements (e.g., system-imposed computational limitations imposed by a selected computational system, or computing environment). Defining p as a vector of optimization parameters and $\hat{s}[n,p]$ as the SE system output obtained with p, the problem can be rewritten as:

maximize $Q(\hat{s}[n,p])$, subject to $C(p) \leq C_{max}$, $L \leq p \leq U$.

Equation (25)

where Q(•) is the optimization criterion, C(•) is the constraint function that calculates the computational cost associated with the choice of p, and L and U represent, respectively, the selected lower and upper bounds in each element of p.

Since the objective function is nonlinear and not known to be convex, there is no effective method for solving Equation (25). However, nonlinear programming problem can still be solved by several approaches, each of which involves some compromises. The combinatorial nature of the problem might suggest performing a brute force search, however, even with as few as a dozen variables this problem can be intractable.

8.2 Example Approach to Solving Optimization Problem

As but one example of a suitable approach for solving the described optimization problem, so-called Genetic Algorithms (GAs) have been successfully applied to this type of non-convex mixed-integer optimization problems. The basic idea is to apply genetic operators, such as mutation and crossover, to evolve a set of initial solutions, or population, in order to find the solution that maximizes the cost function. A key element of the evolutionary process of the GA in dealing with nonlinear constraints is determined by the so-called tournament selections. These allow for several random pairwise comparison between sets of parameters which quickly determine the boundary of the feasible region. Several examples of intermediate method acts of the exemplary GA are summarized below:

Step 1—An initial population of M solutions can first be generated by randomly choosing the values of each set from the feasible region:

$$p_m^{(0)} : \cup (L, U). \qquad \text{Equation (26)}$$

The terms L and U can be determined empirically based on the observation of the system behavior during the implementation phase. As a general remark, the feasibility region determined by the bounds in Equation (25) is larger than the one allowed by the constraint, e.g., the complexity of the U solution might be much higher than $C_{max}$. However, a methodology will be used in the evolutionary process to enforce the feasibility of the solution.

Step 2—Sets that go through crossovermutation can be selected in a series of tournament selections: a random set of $\omega$ parameter sets is extracted from the population, $\Omega \subset \Pi^{(k)}$, and the set $p_m^{(k)} \in \Omega$ with the best $Q(\hat{s}[n, p_m^{(k)}])$ can then be selected. The constraint is imposed in the pairwise comparison used in tournament selection by making sure that when one feasible and one infeasible solutions are compared, the feasible solution is chosen, and when two infeasible solutions are compared, the one with smaller constraint violation is chosen.

Crossover—Given two sets of parameters from a previous generation $p_n^{(k)}, p_l^{(k)} \in \Pi^{(k)}$, a good but not optimum value of their cost function may be due to the fact that both sets approximate well some but not all parameters p. However, as the function $Q(\hat{s}[n,p]$ is not invertible, we are unable to determine which parameters have a good/bad match. As a consequence, the crossover function is based on a random weighted mean of the two set of parameters $$p_m^{(k+1)} = \Phi p_n^{(k)}, p_l^{(k)} = \beta e p_n^{(k)} + (1-\beta) e p_l^{(k)} \qquad \text{Equation (27)}$$

where $\beta : \cup (0,1)$ and e denotes element-wise multiplication.

Mutation—The mutation $p_m^{(k+1)} = \Psi(p_n^{(k)})$ of the set of values has the objective of prevent falling of all elements in the population to a local minimum. Different heuristic approaches can be used to design a mutation function and are often associated to the type of problem. Given that strategies like variable value swapping and other nonlinearities do not really apply to our case, we will use only the Uniform perturbation which replaces the value of a l-th element with a uniform random value selected between the upper and lower bounds of that particular element:

$$\Psi_a(p_{n_l}^{(k)}) = \delta, \delta : \cup (L_l, U_l). \qquad \text{Equation (28)}$$

Step 3—The Step 2 is repeated until a halting criterion is reached, e.g., the best cost function does not changes for $\Delta k$ generations or a prescribed number of generations is reached. The set of parameters $p_m^{(K)} \in \Pi^{(K)}$ with the largest value of the cost function will provide our estimate:

$$p = \underset{p_m^{(K)} \in \Pi^{(K)}}{\mathrm{argmax}}\; Q(\hat{s}[n, p_m^{(K)}]) \qquad \text{Equation (29)}$$

Note that not necessarily all the solutions in the K-th generation might fall within the feasible region, however, their percentage over the complete set will be quite small as long as K is large enough.

Section 9

Experimental Analysis

In the experimental evaluation, the optimization framework presented in Section 7 was used to find an appropriate solution for the parameter of the SE system presented in Section 6 used in the two scenarios considered, ASR front-end and full-duplex communications. Here we provide details for the method proposed for evaluation and the results obtained.

9.1 Experimental Setup
9.1.1 Example of Experimental Dataset Generation

A key element to any data driven approach is to have a large and well structured amount of data for training and testing. In our case, to properly optimize and evaluate the SE system, we require a large amount of conversational speech. In order to do so, two speech databases were generated using the TIMIT database[1], one for the optimization process and one for testing. We formalized in the ITU-T P.59 standard to generate Near-End (NE) and Far-End (FE) signal and to determine the duration and patterns of conversational events such as the length of the talk-spurt (TS), pause (PAU), double-talk (DT), and mutual silence (MS), shown by way of example in FIG. 4. Suitable choices of Signal-to-Echo Ratio (SER) and Signal-to-Noise Ratio (SNR) need also to be determined depending on the targeted application scenario.

[1] The TIMIT database contains a total of 6,300 sentences (≈5.4 hours), sampled at 16 kHz, consisting of 10 sentences spoken by 630 native English speakers from 8 major dialect regions of the United States.

An instance of the full-duplex database is created as follows. We combine two TIMIT sentences to form the NE speech by concatenating them. These are randomly chosen from the 6,300 sentences by sampling without replacement (to avoid not choosing some utterance). We then extract their voice activity from their phonetic transcription (given on a sample by sample basis) thus determining the speech and non-speech sections duration. Since the TIMIT samples have little non-speech sections, we randomly zero-pad the beginning and the end of the concatenated speech file as well as between the two TIMIT sentences for the speech activity to have a uniform duration distribution between 30 and 45%, thus making the non-speech probability between 55 and 70%, in line with previous studies on conversational speech.

The FE speech pattern was generated using a 2-state Markov chain which is a collapsed version of a 4-state Markov chain discussed above in Section 4, given that the NE pattern is already fixed. In particular, from the FE side, MS will coincides with NE, creating a PAU state, and DT will coincide with FE itself, creating a TS state. We tune the transition probabilities that define the transition matrix of the Markov chain to match the above mentioned statistics of the NE speech using a Markov chain Monte Carlo (MCMC)

sampling approach. The FE speech databases was generated concatenating and removing pauses from the ITU-T P-Series signals[2]. Once the on-off speech pattern of the FE was created, we randomly choose the starting and ending point in the FE channel, and then we overlap it with the NE. Given that certain transitions are not allowed in the conversational model, we run several instances of the Markov chain until the DT probability ranges from 7% to 17% and MS probability from 20% to 30% and no DT-MS and NE-FE transitions occur. An example of the on-off pattern and conversational events for an element of the conversational database is shown in FIG. 4, described above.

[2] The ITU-T P-Series test signals are composed of 320 sentences (16 sentences per 20 languages), sampled at 16 kHz, making for about one hour of speech.

A noise database comprised of babble (e.g., airport, cafeteria, exhibition, and restaurant) noise, white and pink noise, impulsive noise (e.g., hammering), airplane cabin noise, car noise from a variety of car models, and street noise was used. The RIRs were calculated in office environments using the Audio Precision APx525 log-swept chirp signal through the Beats Pill portable speaker and truncated to the desired length ($f_s$=48 kHz, resampled at 16 kHz). A set of 10 RIRs was then chosen with average reverberation time, $RT^{60}$, of 0.28 s.

The 3,150 NE and FE segments were then normalized to −26 dBov to avoid clipping, following ITU-T Recommendations, and convolved with their respective RIR with normalized unitary energy. The microphone signal was created as follows. The NE signal was mixed with the FE signal at SER uniformly distributed between −30 and 5 dB. The scaling was done by calculating the energy of the signals. The noise was then mixed at an SNR uniformly distributed between −5 to 10 dB, according to the noise and the mixed speech signal energies. the choices of RIRs, SER, and SNR were considered empirically appropriate given the possible usage scenarios considered for the Beats Pill portable speaker.

9.1.2 Example of Cost Functions

Several different types of cost function can be used depending on the application targeted. For the full-duplex communication scenario, we used the standardized POLQA algorithm to measure the improvement in Mean Opinion Score (MOS). Since POLQA is a full-referenced measurement system, our objective function is the difference in MOS compared to a clean reference:

$$Q(\hat{s}[n], p]) = \Delta MOS(\hat{s}[n], y[n]) =$$
$$= MOS(\hat{s}[n], s[n]) - MOS(y[n], s[n]),$$

which has been shown to provide better objective and subjective results for the tuning purpose.

Since $\Delta MOS$ ($\hat{s}[n],y[n]$) is defined for only a set of files, we need to assess the quality measure over the whole training or testing dataset to obtain a $\Delta MOS$ score for the dataset. Accordingly, $\Delta MOS$ ($\hat{s}[n],y[n]$) is calculated for each $s_i[n]$ file, where i is the index of each file. The $\Delta MOS$ score for the dataset can be computed from any meaningful function pertaining to the ensemble of speech samples. Such meaningful functions can include, for example, functions like "min" (e.g., determining the minimum $\Delta MOS$ score for the dataset), "max" (e.g., determining the maximum $\Delta MOS$ score for the dataset), "mean" (e.g., determining the mean $\Delta MOS$ score for the dataset), "median" (e.g., $\Delta MOS$ score for the dataset), etc.

For the ASR front-end scenario, the capability of the recognizer can be examined by measuring its accuracy in recognizes phones, the building blocks of words and utterances, through Phone Accuracy Ratio (PAR).

Another example is hearing aids, where the speech intelligibility, as measured through, e.g., short-time objective intelligibility measure (STOI) is often the preferred quality measure.

We use the HTK toolkit to train an acoustic model composed of 61 phones. A set of 13 Mel-frequency cepstral coefficients (MFCCs) with their first and second derivatives, for a total of 39 coefficients, are generated and used as features for our experimental analysis. We used 5-state Hidden Markov Models (HMMs) with a 8-mixture Gaussian Mixture Model (GMM) for each phone. We normalized the mean of the MFCCs for properly applying the direct masking. We trained our HMMs with clean speech only. A better approach would have been to train over speech processed by our front-end and other conditions (e.g., different noise conditions), however we wanted to decouple the tuning phase in order to obtain the set of parameter that best reduces the mismatch between clean and corrupted speech. The recognition accuracy is also dependent on the design of the language model. We chose a simple bigram model.

9.1.3 Optimization Process

Considering the optimization problem in Equation (25), we can define the optimization vector as composed by the 36 parameters comprising the SE system presented in Section 2. The total cost was fixed to $C_{max}$=50. The genetic algorithm used had a population of M=100 possible candidates and we ran it for K=10 generations, which we observed to be a good trade-off between accuracy of the solution and speed of the optimization process. Given the relatively small size of the population, we chose a deterministic tournament selection by calculating the fitness function Q(•) for all the elements of the population. A seed was given to generate the initial population by biasing this towards a known hand-tuned solution that achieved reasonable values in the computational design phase, $p_{INIT}$. This was done with the same operator used in the crossover operation Equation (27), where each randomly generate solution is weighted with $p_{INIT}$ and $\beta$:∪(0.3,0.7).

The best $M=^{20}$ or less sets of parameters in each generation that fulfill the constraint were migrated to the next generation, of the remaining sets half went through crossover and half through mutation. The optimization process took about 72 to 90 hours on a 16-core Intel Xeon machine with highly parallelized scripts. Note that while the tuning database is fixed, calculating ($\hat{s}[n,p]$) requires to run all 3,150 for each population element p at each iteration. The Analysis-Modification-Scheme as well as the different computational components operated all on a 16 ms frame size with 50% overlap.

9.2 Experimental Results

Figure 7:
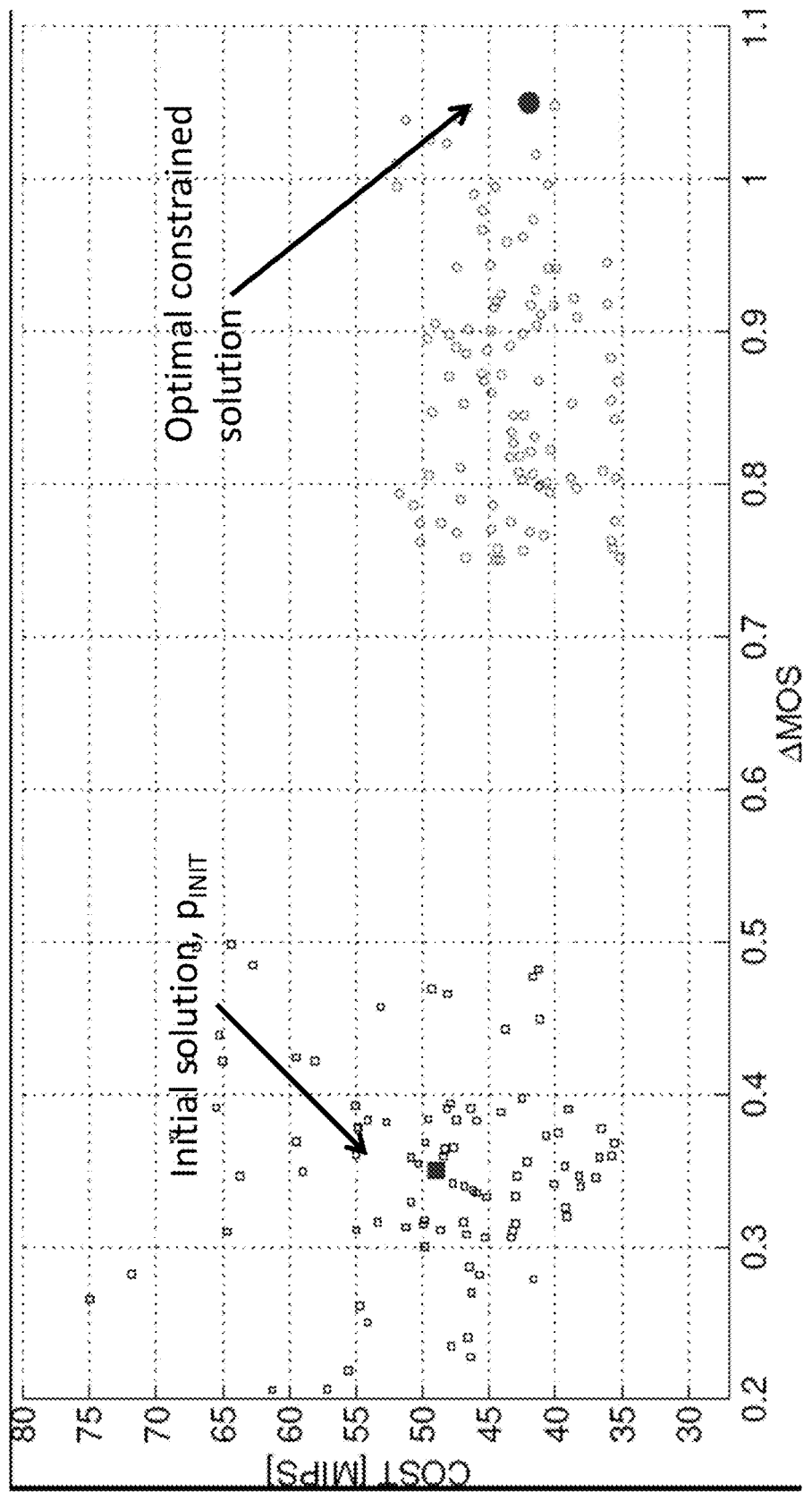
FIG. 7 shows a scatterplot of an initial population (squares) and a final population (circles) in a constrained optimization as disclosed herein over ΔMOS on a selected SE system training database. The initial solution $p_{INIT}$ and the optimal final solution that respects the constraint are shown.
Figure 8:
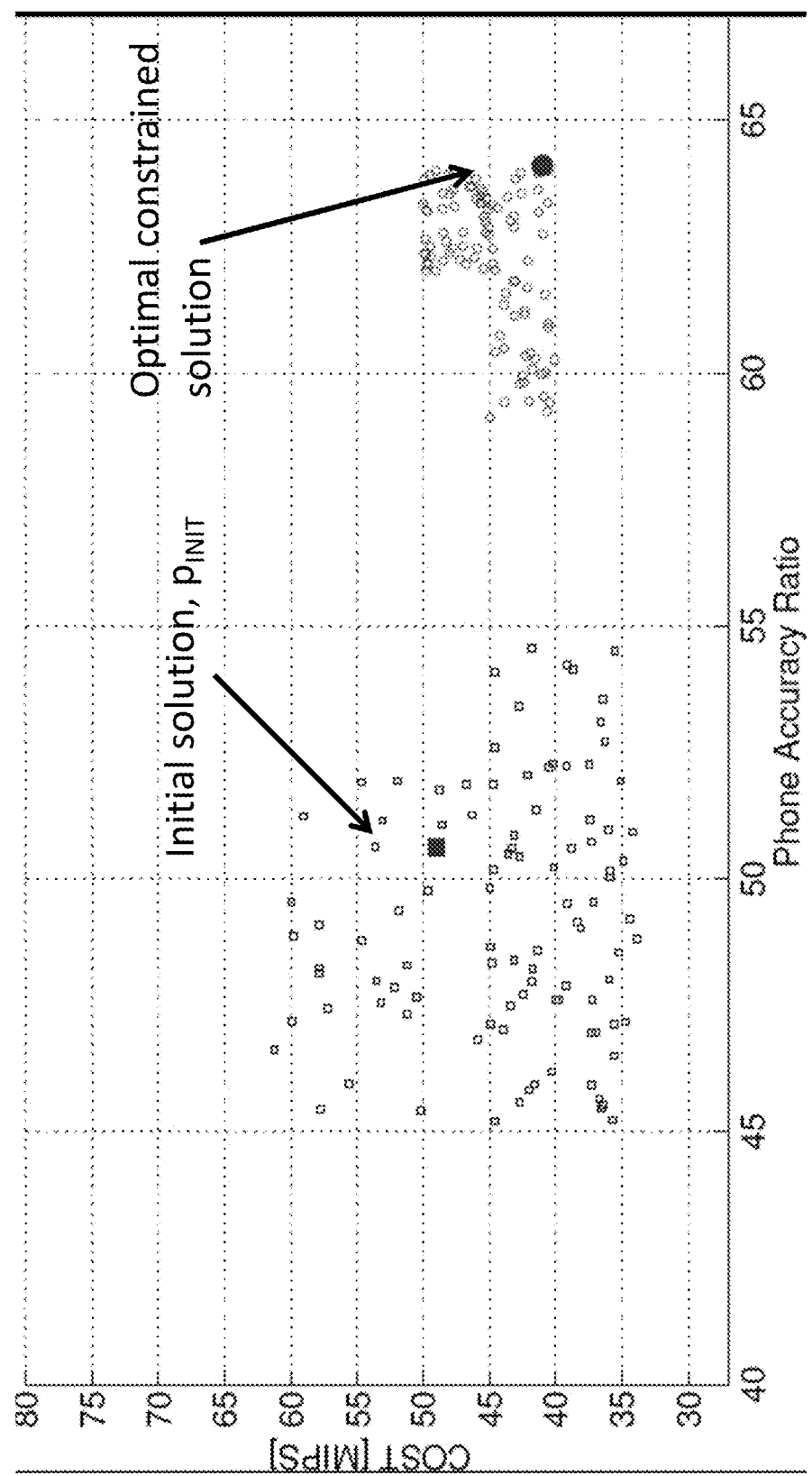
FIG. 8 shows a scatterplot of an initial population (squares) and a final population (circles) in a constrained optimization as disclosed herein over PAR on a selected SE system training database. The initial solution $p^{INIT}$ and the optimal final solution that respects the constraint are shown.

In FIGS. 7 and 8, we show a scatterplot of mean fitness values Q(•) for each element of the initial population and final population of the evolutionary optimization process. Our initial hand-tuned estimate $p_{INIT}$ achieves a PAR (FIG. 8) of 50.62% and a $\Delta MOS$ of 0.36 (FIG. 7) calculated over the training database and a PAR to 51.04% and $\Delta MOS$ of 0.32 over the testing database, confirming the rough similarity in statistics between the two datasets. The population at the K=10 iteration, only slightly different from the population at the K=9 iteration proving convergence, shows the effectiveness of the optimization framework.

The solution optimized for ASR, $p_{ASR}$ and the solution optimized for MOS, $p_{MOS}$, on the training database, not only achieve much higher PAR and ΔMOS, they also achieve a net 20% reduction in computational complexity. The sets of parameters are then evaluated on the testing database and the results are shown in Table 2 where the improvement are still very significant. Another strength of this optimization framework is that a large number of solutions are in the neighborhood of the optimal solution. These not only fulfill the constraint, but can achieve similar performance at just slightly lower quality. Therefore, from a SE system pre-deployment perspective, having a handful of possible solution is beneficial and exploring a few other solution through, e.g., listening tests can be beneficial. Note that a few solution violate the constraint, this is because we allow the constraint to be violated during the evolution of the population, as noted in Section 7.

Another interesting point is that a subset of all the parameters actually affect the complexity. However, the nonlinearity of the cost function does not allow us to separate these variables. The values resulting from the optimization methods for these parameters follow known differences in SE when targeting recognition and intelligibility of speech versus perceived quality. In particular, $p_{ASR}$ privileges solutions where the signal would sound distorted but most of the background noise and FE speech is removed, while $p_{MOS}$ uses choices of parameters that are less aggressive, allowing more noise and echo to go through, more effectively exploiting the masking properties of speech itself in mild background noise conditions. A clear example of this is the binary optimization parameter where we allow the choice of post-processing masking, optimizing with PAR privileges the quasi-binary mask which introduces artifacts but increases accuracy, while optimizing with ΔMOS privileges the LSA mask, well known to be a better soft decision gain more related to perception.

TABLE 3

Results of the Exemplary GA optimization.

| | PAR | ΔMOS | C(.) | $C_{max}$ |
|---|---|---|---|---|
| $p_{INIT}$ | 51.04 | 0.32 | 49.14 | 50 |
| $p_{ASR}$ | 62.94 | 0.65 | 41.17 | 50 |
| $p_{MOS}$ | 60.07 | 0.87 | 42.56 | 50 |

Section 10

Overview of Active Speech Recognition

In the following sections, we disclose robust front-end ASR techniques, with such techniques applied to a single microphone limited-vocabulary system during continuous monaural music playback being a useful example for illustration of the techniques. In contrast to previous techniques, the microphone is placed very close to the loudspeakers, thus making the ratio between the energy of the uttered command and the music playback, near-end speech to echo ratio (SER), very low, e.g., between about −35 dB and about −15 dB, such as between about −30 dB and about −20 dB, with between about −28 dB and about −22 dB being but one particular SER range.

The front-end technique can be divided in two parts. Firstly, we disclose double-talk robust solutions for echo cancellation to retrieve a first estimate of the command. Secondly, residual noise reduction methods allow us to combine a mean-squared error (MSE) approach with an estimate of an ideal binary mask. A resulting ASR technique can be defined by several parameters which can be tuned to achieve a suitable (e.g., a high) recognition rate by casting the tuning problem as a nonlinear program solved efficiently through, for example, a genetic algorithm (GA). Although a genetic algorithm can be used as an example, other suitable methods for solving non-linear problems can be used. For example, grid search and other optimization methods can be applied to solve such combinatorial problems.

A similar approach was previously disclosed in commonly assigned U.S. Patent Application No. 61/893,147 and in U.S. Patent Application No. 61/937,522, each of which patent applications is hereby incorporated by reference as fully as if it was reproduced fully, for all purposes, to improve objective measures of perceptual quality of a speech enhancement system in a full-duplex communication context. The training and evaluation corpora in our example are a synthetic mixture of clean speech (from the TIMIT database) and playback music, both convolved with different impulse responses and further mixed with background noise to cover a suitably large range of deployment scenarios. The acoustic models of the ASR engine can be trained by using speech processed by the front-end, an effective way to learn and exploit the typical distortions of the system itself.

The following sections are organized as follows. In Section 11, we describe a suitable speech enhancement technique and outline the corresponding parameters to be tuned. The tuning and optimization methodology of these parameters is presented in Section 12. Section 13 discloses aspects of speech recognizers and related experimental results from tuning such recognizers. The experimental results in Section 13 are divided in two parts. Firstly, we present the results of the training and evaluation of the front-end and acoustic models using the TIMIT database. Secondly, we change the language model and implement our ASR system for a limited vocabulary command recognizer in very adverse conditions.

Section 11

Example of a Speech Enhancement Systems

Figure 9:
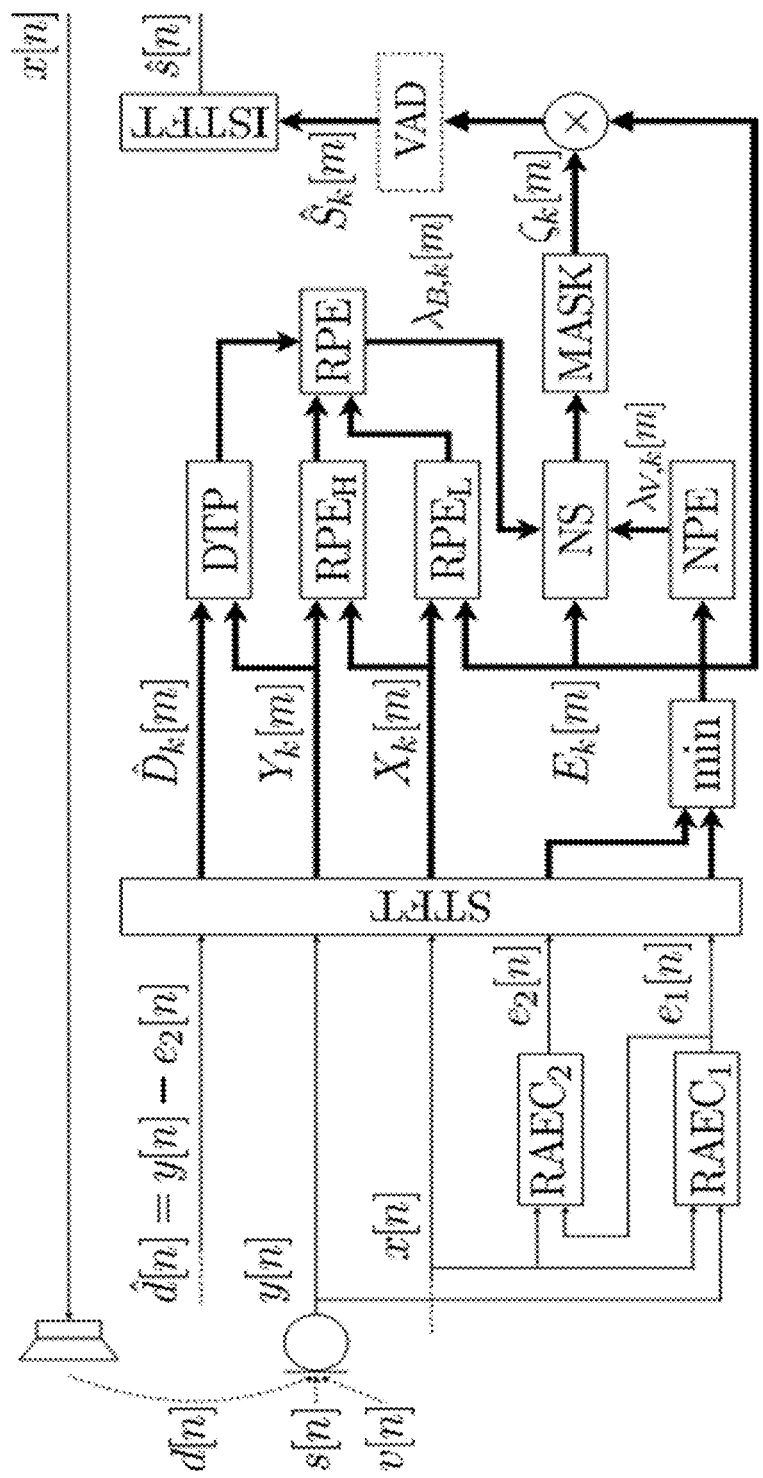
FIG. 9 shows yet another block diagram of one particular example of many possible speech enhancement systems of the type disclosed herein.

This section presents an example front-end technique and outlines several speech enhancement/speech recognition tuning parameters that will have values selected. Referring now to FIG. 9, let y[n] be the near-end microphone signal, which consists of the near-end speech s[n] and noise v[n] mixed with the acoustic echo d[n]=h[n]*x[n], where h[n] is the impulse response of the system, x[n] is the far-end reference signal, and * is the convolution operator. An overall block diagram of a speech enhancement system is shown in FIG. 9. As shown, a speech enhancement system can include two robust acoustic echo cancellers (RAEC), a double-talk probability (DTP) estimator, two residual power estimators (RPE), a noise power estimator (NPE), a noise suppressor (NS), and a voice activity detector (VAD).

11.1 Robust Acoustic Echo Canceler

Since strong near-end interference may corrupt the error signal of the AEC and cause the adaptive filter to diverge, a RAEC system can be used, where an error recovery non-linearity (ERN) and robust adaptive step-size control allows for continuous tracking of the echo path during double talk. To reduce the delay of the frequency-domain adaptive filter, a multi-delay adaptive filter structure can be used. A cascaded structure can be used, for example, where the output of the first RAEC is fed to the input of the second RAEC, which is different from techniques where the input to the second RAEC is still the microphone signal (parallel structure instead of the cascaded structure) and a different ERN is used for the RAEC.

The RAEC computation for each RAEC block is summarized in Table 4, where ○ denotes element-wise operation, $\{\bullet\}^T$ is the transpose operator, and diag $\{\bullet\}$ forms a diagonal matrix. In previous work, the power spectral density estimate of the error signal is estimated in (Equation 30) using the ERN:

$$\underline{\rho}_{ee}[m] = \alpha_{AEC}\underline{\rho}_e[m-1] + (1-\alpha_{AEC})(\underline{\varepsilon}[m] \cdot \underline{\varepsilon}^*[m]) \quad \text{(Equation 30)}$$

$$\phi_{old}(E_k[m]) = \begin{cases} \dfrac{\sqrt{P_{ee,k}[m]}}{|E_k[m]|} E_k[m], & |E_k[m]| \geq \sqrt{P_{ee,k}[m]} \\ E_k[m], & \text{otherwise,} \end{cases} \quad \text{(Equation 31)}$$

where $p_{ee}$ is the elements in the vector $\rho_{ee}$ in (Equation 30). The ERN in this work is experimentally chosen to be $$\underline{\rho}_e[m] = \alpha_{AEC}\underline{\rho}_e[m-1] + (1-\alpha_{AEC})(\underline{\varepsilon}[m] \cdot \underline{\varepsilon}^*[m])^{\circ(1/2)} \quad \text{(Equation 32)}$$

$$\phi_{new}(E_k[m]) = \begin{cases} \dfrac{\sqrt{P_{e,k}[m]}}{|E_k[m]|} E_k[m], & |E_k[m]| \geq \sqrt{P_{e,k}[m]} \\ E_k[m], & \text{otherwise,} \end{cases} \quad \text{(Equation 33)}$$

for both the RAEC, where the statistical parameter for the error signal is updated using the magnitude $(\underline{\varepsilon}[m] \circ \underline{\varepsilon}^*[m])^{\circ(1/2)}$ instead of the signal power of the error signal.

TABLE 4

Robust acoustic echo canceler.

Definitions $(\mathcal{F})_{k+1,n+1} \equiv e^{-j\frac{\pi}{N_{AEC}}kn}$, k, n = 0, ..., $2N_{AEC} - 1$ $\Gamma^{01} \equiv \text{diag}\{[0^T_{N_{AEC}\times 1}, 1^T_{N_{AEC}\times 1}]^T\}$ $\Gamma^{10} \equiv \text{diag}\{[1^T_{N_{AEC}\times 1}, 0^T_{N_{AEC}\times 1}]^T\}$ $\underline{x}[m] = [x[(m-1)N_{AEC}], \ldots, x[(m+1)N_{AEC}-1]]^T$ $\underline{y}[m] = [0_{1\times N_{AEC}}, y[mN_{AEC}], \ldots, y[(m+1)N_{AEC}-1]]^T$ Echo cancellation $\underline{x}[m] = \mathcal{F}\underline{x}[m] = [x_0[m], \ldots, x_{2N_{AEC}-1}[m]]^T$ $\underline{v}[m] = \mathcal{F}[m] = [y_0[m], \ldots, y_{2N_{AEC}-1}[m]]^T$ $\hat{\underline{h}}_i^{(0)}[m] = \hat{\underline{h}}_i^{(N_{iter}-1)}[m-1]$ $e[m] = y[m] - \Gamma^{01}\mathcal{F}^{-1}\sum_{i=0}^{M_{AEC}-1}\left(\hat{\underline{h}}_i^{(0)}[m] \circ \underline{x}[m]\right)$ for (j = 1, ..., $N_{iter} - 1$)

TABLE 4-continued

Robust acoustic echo canceler.

$\underline{\varepsilon}[m] = \mathcal{F}e[m],$ $\phi(\underline{\varepsilon}[m]) \equiv [\phi(\mathcal{E}_0[m]), \ldots, \phi(\mathcal{E}_{2N_{AEC}-1}[m])]$ $\underline{\rho}_{xx}[m] = \alpha_{AEC}\underline{\rho}_{xx}[m-1] + (1-\alpha_{AEC})(\underline{x}[m] \circ \underline{x}^*[m])$ $\underline{\rho}_{ee}[m] = \alpha_{AEC}\underline{\rho}_{xx}[m-1] + (1-\alpha_{AEC})(\underline{\varepsilon}[m] \circ \underline{\varepsilon}^*[m])$ $\underline{\rho}_e[m] = \alpha_{AEC}\underline{\rho}_e[m-1] + (1-\alpha_{AEC})(\underline{\varepsilon}[m] \circ \underline{\varepsilon}^*[m])^{\circ(1/2)}$ $\phi(\varepsilon_k[m]) = \begin{cases} \dfrac{\sqrt{P_{e,k}[m]}}{|\varepsilon_k[m]|} |\varepsilon_k[m]| \geq \sqrt{P_{e,k}[m]} \\ \varepsilon_k[m], \quad \text{otherwise} \end{cases}$ $\underline{v}[m] = \mu_{AEC}\underline{\rho}_{xx}[m] \circ \left[(\underline{\rho}_{xx}[m])^{\circ 2} + \gamma_{AEC}(\underline{\rho}_{ee}[m])^{\circ 2}\right]^{\circ(-1)}$ $\hat{\underline{h}}_i^{(j)}[m] = \hat{\underline{h}}_i^{(j-1)}[m] + [\underline{v}[m] \circ \phi(\underline{\varepsilon}[m]) \circ \underline{x}[m-i]]$ $\hat{\underline{h}}_i^{(j)}[m] = \begin{cases} \mathcal{F}\Gamma^{10}\mathcal{F}^{-1}\hat{\underline{h}}[m], & \text{mod}(m, M_{AEC}) = i \\ \hat{\underline{h}}_i^{(j)}[m], & \text{otherwise} \end{cases}$ $e[m] = y[m] - \Gamma^{01}\mathcal{F}^{-1}\sum_{i=0}^{M_{AEC}-1}\left(\hat{\underline{h}}_i^{(N_{iter}-1)}[m] \circ \underline{x}[m]\right)$ end for To reduce the complexity of the RAEC, the alternative unconstrained multidelay block frequency domain filtering structure can be used:

$$\hat{\underline{h}}_i^{(j)}[m] = \hat{\underline{h}}_i^{(j-1)}[m] + [\underline{v}[m] \cdot \phi(\underline{\varepsilon}[m]) \cdot \underline{x}[m-i]], \quad \text{(Equation 34)}$$

$$\hat{\underline{h}}_i^{(j)}[m] = \begin{cases} F\Gamma^{10}F^{-1}\hat{\underline{h}}_i^{(j)}[m], & \text{mod}(m, M_{AEC}) = i, \\ \hat{\underline{h}}_i^{(j)}[m], & \text{otherwise,} \end{cases} \quad \text{(Equation 35)}$$

where the gradient constraint (Equation 35) is applied on only one block at each block time m instead of applying on every blocks:

The final output of the RAEC is chosen based on the minimum energy output signals of the two RAEC in the STFT domain:

$$E_{new,k}[m] = \quad \text{(Equation 36)}$$

$$\min\{E_{1,k}[m], E_{2,k}[m]\} = \begin{cases} E_{1,k}[m], & |E_{1,k}[m]| \leq |E_{2,k}[m]|, \\ E_{2,k}[m], & |E_{1,k}[m]| > |E_{2,k}[m]|. \end{cases}$$

Note that the phase term of (Equation 36) in this example is chosen to be the same as the signal with minimum output energy, while in previous examples, the phase term has been chosen from one of AEC output signals, e.g., $$E_{old,k}[m] = \min\{|E_{1,k}[m]|, |E_{2,k}[m]|\}e^{j\angle E^{2,k}[m]}. \quad \text{(Equation 37)}$$

The tuning parameters for each of the RAEC consist of the frame size $N_{AEC}$, the number of partitioned blocks $M_{AEC}$, the number of iterations $N_{iter}$, the step-size $\mu_{AEC}$, the tuning parameter $\gamma_{AEC}$, and the smoothing factor $\alpha_{AEC}$ for the power spectral density estimation.

11.1.1 Extension to the Multichannel and Multimcrophone Cases

Figure 9A:
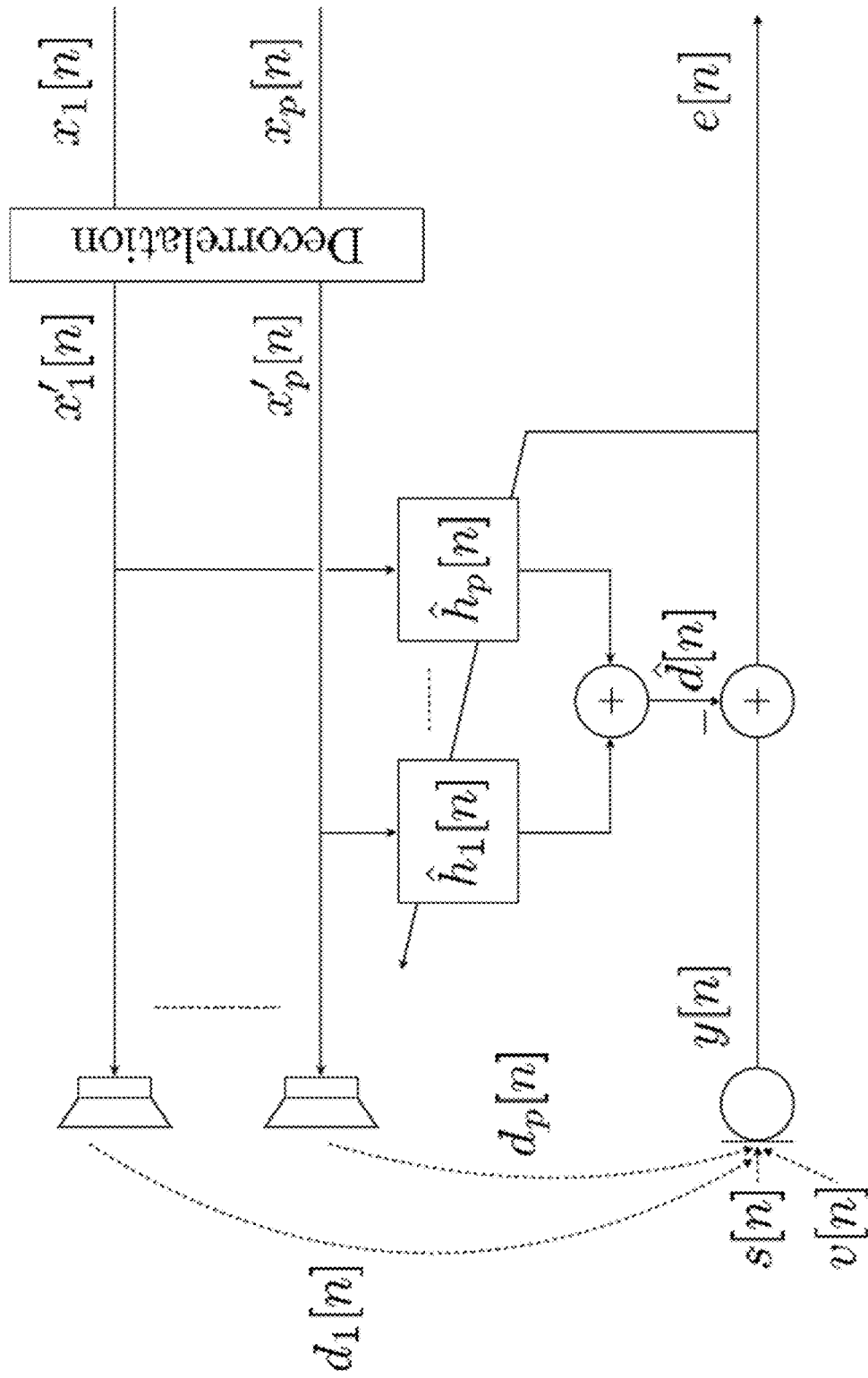
FIG. 9A shows a schematic illustration of a speech enhancement system having multichannel echo cancellation.
Figure 9B:
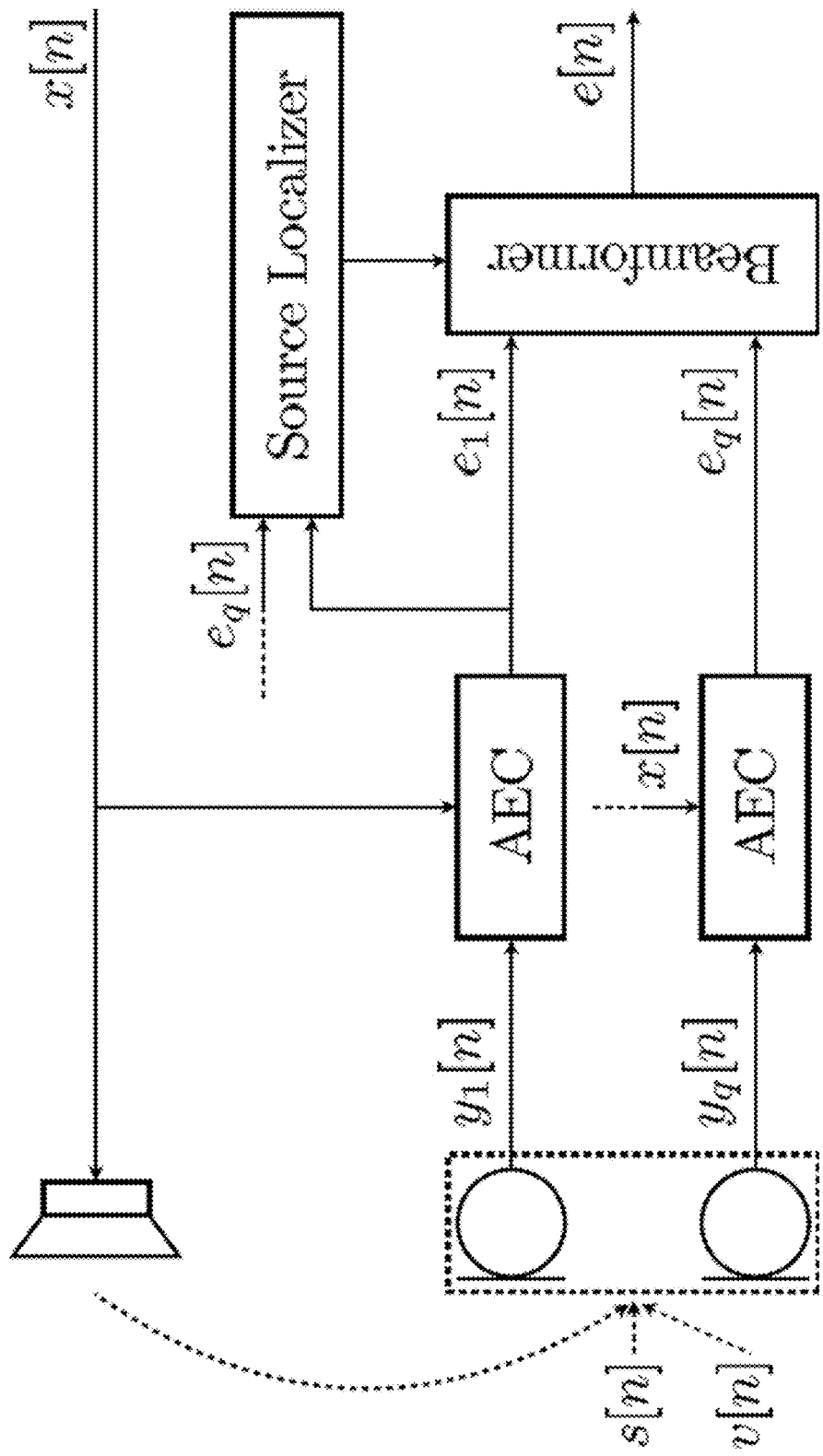
FIG. 9B shows a schematic illustration of a speech enhancement system having a plurality of microphones, a source tracker, and a beamformer.
Figure 10:
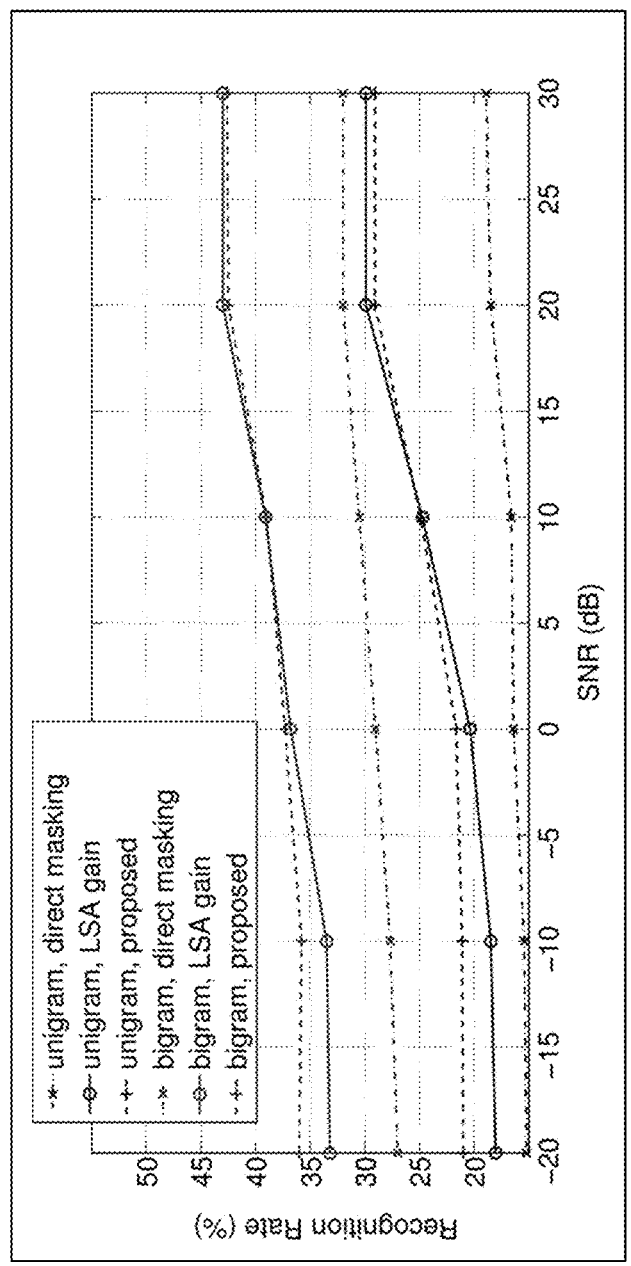
FIG. 10 shows a comparison plot of speech-recognition rates using different speech recognition techniques for various use scenarios; comparison of recognition rates on noisy TIMIT for our proposed direct masking with direct binary masking and MMSE-based LSA gain for different speech-to-noise ratios (SNRs) and a constant SER of −20 dB. Recognition rate for the bigram model with an ideal binary mask is around 65% throughout the SNR range.

Although a single-channel system is described above, disclosed techniques can be extended to systems playing a plurality of channels, and to systems having a plurality of microphones. For example, in a multichannel case, each loudspeaker output $x_p[n]$ can be decorrelated from the other channels. The AEC described above can be modified as shown in FIG. 9A, where the adaptive filters $\hat{h}_1[n]$ to $\hat{h}_P[n]$ that estimate the echo paths from each of loudspeaker channels 1 through P to the microphone can be implemented using the RAEC structure. The residual echo suppressor also needs to be expanded to estimate the contribution of residual echo from each of the loudspeakers to the microphone (by using more residual echo power estimators, where each residual power echo power estimator can take input from each loudspeaker signal $x_p[n]$). In the case of multimicrophone case a beamformer can be used to localize and amplify sound sources and the output of the beamformer can subsequently be fed to the single microphone and single channel framework described above (see FIG. 9B). A combination of the multichannel AEC and the multi-microphone setup is also possible to form a more generalized multi-loudspeaker multi-microphone system.

11.2 Residual Echo Power Estimator

Since the AEC usually cannot cancel all the echo signal due to modeling mismatch, further enhancement from the residual echo suppressor (RES) can be provided to improve the voice quality. A coherence based method can be used for the RPE, and a modified version of the DTP estimator can be used for a more accurate estimate of the residual echo power. The RPE with the DTP estimator is summarized in Table 5, where $w_A$ is the analysis window for the short-time Fourier transform (STFT), $N_{STFT}$ is the frame size of the STFT, and $R_{STFT}$ is the frame shift size. As shown in (Equation 45), the DTP estimator can differ from other techniques since the coherence is calculated between the RAEC estimated echo signal $\hat{d}$ and the microphone signal y rather than between the loudspeaker signal X and the microphone signal y. A traditional way to estimate the coherence was to use the following statistical parameters:

$$\Phi_{XX,k}[m] = \alpha_{DTP}\Phi_{XX,k}[m-1] + (1-\alpha_{DTP})|X_k[m]|^2, \quad \text{(Equation 38)}$$

$$\Phi_{YY,k}[m] = \alpha_{DTP}\Phi_{YY,k}[m-1] + (1-\alpha_{DTP})|Y_k[m]|^2, \quad \text{(Equation 39)}$$

$$\Phi_{XY,k}[m] = \alpha_{DTP}\Phi_{XY,k}[m-1] + (1-\alpha_{DTP})X^*_k[m]Y_k[m], \quad \text{(Equation 40)}$$

$$\rho_{old,k}[m] = |\Phi_{XY,k}[m]|^2/(\Phi_{XX,k}[m]\Phi_{YY,k}[m]). \quad \text{(Equation 41)}$$

However, the calculation of the coherence using:

$$\Phi_{\hat{D}\hat{D},k}[m] = \alpha_{DTP}\Phi_{\hat{D}\hat{D},k}[m-1] + (1-\alpha_{DTP})|\hat{D}_k[m]|^2, \quad \text{(Equation 42)}$$

$$\Phi_{YY,k}[m] = \alpha_{DTP}\Phi_{\hat{D}\hat{D},k}[m-1] + (1-\alpha_{DTP})|Y_k[m]|^2, \quad \text{(Equation 43)}$$

$$\Phi_{\hat{D}Y,k}[m] = \alpha_{DTP}\Phi_{\hat{D}Y,k}[m-1] + (1-\alpha_{DTP})\hat{D}_k[m]Y_k[m] \quad \text{(Equation 44)}$$

$$\rho_{new,k}[m] = |\Phi_{\hat{D}Y,k}[m]|^2/(\Phi_{\hat{D}\hat{D},k}[m]\Phi_{YY,k}[m]). \quad \text{(Equation 45)}$$

is possible at least in part because the estimated echo signal $\hat{d}$ can be reliably obtained even during double talk due to the robust echo path tracking performance of the RAEC. Therefore, the coherence measure $\rho_k$ can be reliably estimated based on the estimated echo $\hat{d}$ and the microphone signal y.

The residual echo power can be estimated by utilizing the output of the double talk probability estimator. Ideally, when the double-talk probability is high, the level of residual echo power estimate desirably is low so as to not distort the near-end speech when suppressing the residual echo. On the other hand, when the double-talk probability is low, the level of residual echo power estimate desirably is high to suppress as much residual echo as possible. The high level residual echo power $\lambda_{B_H,k}$:

$$\lambda_{B_H,k}[m] = |\Phi_{XE,k}^T[m]X_{H,k}[m]/\Phi_{X_H,k}[m]|^2 \quad \text{(Equation 46)}$$

can be estimated based on the coherence of the microphone signal $Y_k$ and the reference signal $X_k$, while the low level residual echo power $\lambda_{B_L,k}$:

$$\lambda_{B_L,k}[m] = |\Phi_{XE,k}^T[m]X_{L,k}[m]/\Phi_{X_L,k}[m]|^2 \quad \text{(Equation 47)}$$

can be estimated based on the coherece of the error signal $E_k$ and the reference signal $X_k$. The residual echo power $\lambda_{B,k}$ can be estimated by utilizing the double-talk probability estimate:

$$P_k^{DT}[m] = \frac{\Lambda^{DT}[m]}{1+\Lambda^{DT}[m]}\frac{\Lambda_k^{DT}[m]}{1+\Lambda_k^{DT}[m]} \quad \text{(Equation 48)}$$

obtained from DTP to combine $\lambda_{B_H,k}$ and $\lambda_{B_L,k}$:

$$\lambda_{B,k}[m] = (1-[m]p_k^{DT}[m])\lambda_{B_H,k}[m] + p_k^{DT}[m]\lambda_{B_L,k}[m]. \quad \text{(Equation 49)}$$

The tuning parameters for the DTP includes the transition probabilities $a_{01}$, $a_{10}$, $b_{01}$, and $b_{10}$, the smoothing factors $\alpha_{DTP}$, and $\beta_{DTP}$, the frequency bin range $[k_{begin}, k_{end}]$, the frame duration $T_{DTP}$, and the adaptation time constants $\tau^{(0)}$ and $\tau^{(1)}$, where $\{\bullet\}^{(0)}$ is for the statistical parameters corresponding to the non-double-talk state and $\{\bullet\}^{(1)}$ is for that of the double-talk state. The tuning parameters for the RPE include the numbers of partitions $M_{RPE_H}$ and $M_{RPE_L}$ and the smoothing factors $\alpha_{RPE_H}$ and $\alpha_{RPE_L}$.

TABLE 5

Double-talk probability and residual power estimator.

Definitions $(F)_{k+1,n+1} \equiv e^{-j\frac{2\pi}{N_{STFT}}kn}$, $k, n = 0, \ldots, N_{STFT} - 1$ $x[m] = F(w_A \circ [x[mR_{STFT}], \ldots, x[mR_{STFT} + N_{STFT} - 1]]^T)$ $= [X_0[m], \ldots, X_{N_{STFT}-1}[m]]^T$ $e[m] = F(w_A \circ [e[mR_{STFT}], \ldots, e[mR_{STFT} + N_{STFT} - 1]]^T)$ Double-talk probability estimation $\Phi_{\hat{D}\hat{D},k}[m] = \alpha_{DTP}\Phi_{\hat{D}\hat{D},k}[m-1] + (1-\alpha_{DTP})|\hat{D}_k[m]|^2$ $\Phi_{YY,k}[m] = \alpha_{DTP}\Phi_{YY,k}[m-1] + (1-\alpha_{DTP})|Y_k[m]|^2$ $\Phi_{\hat{D}Y,k}[m] = \alpha_{DTP}\Phi_{\hat{D}Y,k}[m-1] + (1-\alpha_{DTP})\hat{D}_k^*[m]Y_k[m]$ $\rho_k[m] = |\Phi_{\hat{D}Y,k}[m]|^2 / (\Phi_{\hat{D}\hat{D},k}[m]\Phi_{YY,k}[m])$ $\Lambda_k[m] = \sqrt{\frac{\lambda_k^{(0)}[m-1]}{\lambda_k^{(1)}[m-1]} \frac{\exp\{(\rho_k[m] - \bar{\rho}_k^{(0)}[m-1])^2/\lambda_k^{(0)}[m-1]\}}{\exp\{(\rho_k[m] - \bar{\rho}_k^{(1)}[m-1])^2/\lambda_k^{(1)}[m-1]\}}}$ $\Lambda_k^{DT}[m] = \frac{a_{01} + (1-a_{10})\Lambda_k^{DT}[m-1]}{(1-a_{01}) + a_{10}\Lambda_k^{DT}[m-1]}\Lambda_k[m]$ $\Lambda^{GM}[m] = \exp\left\{\frac{1}{k_{end} - k_{begin} + 1}\sum_{k=k_{begin}}^{k_{end}}\log(\Lambda_k^{DT}[m])\right\}$ TABLE 5-continued Double-talk probability and residual power estimator.

$$\Lambda^{AM}[m] = \frac{1}{k_{end} - k_{begin} + 1} \sum_{k=k_{begin}}^{k_{end}} \Lambda_k^{DT}[m]$$

$$\Lambda^{DT}[m] = \frac{b_{01} + (1-b_{10})\Lambda^{DT}[m-1]}{(1-b_{01}) + b_{10}\Lambda^{DT}[m-1]} \Lambda[m]$$

$$P_k^{DT}[m] = \frac{\Lambda^{DT}[m]}{1+\Lambda^{DT}[m]} \frac{\Lambda_k^{DT}[m]}{1+\Lambda_k^{DT}[m]}$$

$$\alpha^{(0)} = (1 - P_k^{DT}[m])T_{DTP}/\tau^{(0)}$$

$$\bar{\rho}_k^{(0)}[m] = (1-\alpha^{(0)})\bar{\rho}_k^{(0)}[m-1] + \alpha^{(0)}\rho_k[m]$$

$$\lambda_k^{(0)}[m] = (1-\alpha^{(0)})\lambda_k^{(0)}[m-1] + \alpha^{(0)}(\rho_k[m]-\bar{\rho}_k^{(0)}[m])^2$$

$$\alpha^{(1)} = P_k^{DT}[m]T_{DTP}/\tau^{(1)}$$

$$\bar{\rho}_k^{(1)}[m] = (1-\alpha^{(1)})\bar{\rho}_k^{(1)}[m-1] + \alpha^{(1)}\rho_k[m]$$

$$\lambda_k^{(1)}[m] = (1-\alpha^{(1)})\lambda_{k(1)}[m-1] + \alpha^{(1)}(\rho_k[m]-\bar{\rho}_k^{(1)}[m])^2$$

TABLE 5-continued

Double-talk probability and residual power estimator.

Residual echo power estimation $$X_{H,k}[m] = [X_k[m], \ldots, X_k[m-M_{RPE_H}+1]]^T$$

$$\Phi_{XE,k}[m] = \alpha_{RPE_H}\Phi_{XE,k}[m-1] + (1-\alpha_{RPE_H})(X_{H,k})^*E_k$$

$$\Phi_{X_H,k}[m] = \alpha_{RPE_H}\Phi_{X_H,k}[m-1] + (1-\alpha_{RPE_H})|X_k[m]|^2$$

$$\lambda_{B_H,k}[m] = |\Phi_{XE,k}^T[m]X_{H,k}[m]/\Phi_{X_H,k}[m]|^2$$

$$X_{L,k}[m] = [X_k[m], \ldots, X_k[m-M_{RPE_L}+1]]^T$$

$$\Phi_{XE,k}[m] = \alpha_{RPE_L}\Phi_{XE,k}[m-1] + (1-\alpha_{RPE_L})(X_{L,k})^*E_k$$

$$\Phi_{XE,k}[m] = \alpha_{RPE_L}\Phi_{X_L,k}[m-1] + (1-\alpha_{RPE_L})|X_k[m]|^2$$

$$\lambda_{B_L,k}[m] = |\Phi_{XE,k}^T[m]X_{L,k}[m]/\Phi_{X_L,k}[m]|^2$$

$$\lambda_{B,k}[m] = (1-[m]P_k^{DT}[m])\lambda_{B_H,k}[m] + P_k^{DT}[m]\lambda_{B_L,k}[m]$$

11.3 Noise Suppressor

TABLE 6

Noise power estimator and noise suppressor.

Noise power estimation $$P(H_1|E_k[m]) = \left[1 + (1+\xi_{H_1})\exp\left(-\frac{|E_k[m]|^2}{\lambda_{V,k}[m-1]}\frac{\xi_{H_1}}{1+\xi_{H_1}}\right)\right]^{-1}$$

$$\bar{P} = \alpha_P\bar{P} + (1-\alpha_P)P(H_1|E_k[m])$$

$$P(H_1|E_k[m]) = \begin{cases} \min\{P(H_1|E_k[m]), P_{TH}\}, & \bar{P} > P_{TH} \\ P(H_1|E_k[m]), & \text{otherwise} \end{cases}$$

$$E\{\lambda_{V,k}[m]|E_k[m]\} = P(H_1|E_k[m])\lambda_{V,k}[m] + P(H_0|E_k[m])|E_k[m]|^2$$

$$\lambda_{V,k}[m] = \alpha_{NPE}\lambda_{V,k}[m-1] + (1-\alpha_{NPE})E\{\lambda_{V,k}[m]|E_k[m]\}$$

Noise suppressor $$\xi_k[m] = \alpha_{DD}\frac{|\hat{S}_k[m-1]|^2}{\lambda_{V,k}[m] + \lambda_{B,k}[m]} + (1-\alpha_{DD})\max\{\gamma_k[m]-1, 0\}$$ (Equation 50)

$$\gamma_k[m] = \lambda_{E,k}[m]/(\lambda_{V,k}[m] + \lambda_{B,k}[m])$$

$$G_k^{LSA}[m] = \frac{\xi_k[m]}{1+\xi_k[m]}\exp\left(\frac{1}{2}\int_{\frac{\xi_k[m]\gamma_k[m]}{1+\xi_k[m]}}^{\infty}\frac{e^{-t}}{t}dt\right)$$

$$\hat{S}_k[m] = \zeta_k[m]E_k[m]$$

$$\zeta_k[m] = \begin{cases} (1-G_{min})G_k^{LSA}[m] + G_{min} & \xi_k[m] \overset{b_m}{\mathcal{L}} \theta_1, \\ \frac{\alpha}{2}, & \theta_1 \overset{b_m}{\mathcal{L}} \xi_k[m] \overset{b_m}{\mathcal{L}} \theta_2, \\ \frac{2+\alpha}{2}, & \xi_k[m] \overset{b_m}{\mathcal{L}} \theta_2, \end{cases}$$ (Equation 51)

Voice activity Detection $$\sum_k \left[\frac{\gamma_k\xi_k}{1+\xi_k} - \log(1+\xi_k)\right] > \eta$$ (Equation 52)

VAD, where the NS uses the output of both the RPE and the NPE to suppress the residual echo and the noise simultaneously. The low complexity minimum MSE (MMSE) noise power estimator can be used for the NPE, and the Ephraim and Malah log-spectral amplitude (LSA) MMSE estimator can be used for the NS. The estimation of the a priori SNR can be performed using the decision-directed (DD) approach. The tuning parameters of the NPE includes the fixed a priori SNR $\xi_{H_1}$, the threshold $p_{TH}$, and the smoothing factors $\alpha_P$ and $\alpha_{NPE}$. The tuning parameters of the NS consists of the smoothing factor for the SNR estimator $\alpha_{DD}$ and the minimum suppression gain $G_{min}$. Additional tuning parameters from disclosed speech enhancement masks are described below.

11.4 Generation of Speech Enhancement Masks

The direct masking approach can be combined with the NS output mask $G_k^{LSA}$. In particular, we can exploit the estimated bin-based a priori SNR $\xi_k$ to determine the type of masking to be applied to the spectrum. $b_m$ toggles the sign of the thresholds ($\theta_1, \theta_2$, etc.) in the following equation and is optimized during the GA optimization phase.

Our experiments show that for speech recognition applications direct masking can be applied to higher SNRs to achieve good results, while the gain $G_k^{LSA}$ can be used for lower SNRs to achieve good results. However, for perceptual voice quality optimization, the direct masking is used for lower SNRs and the gain $G_k^{LSA}$ for higher SNRS to achieve suitable perceived quality. For other objective score optimizations, the GA can chose an optimal $b_m$. Accordingly, our masking then becomes:

$$\zeta_k[m] = \begin{cases} (1-G_{min})G_k^{LSA}[m]+G_{min}, & \xi_k[m] \overset{b_m}{\lessgtr} \theta_1, \\ \dfrac{\alpha}{2}, & \theta_1 \overset{b_m}{\lessgtr} \xi_k[m] \overset{b_m}{\lessgtr} \theta_2, \\ \dfrac{2+\alpha}{2}, & \xi_k[m] \overset{b_m}{\lessgtr} \theta_2, \end{cases}$$

where $G_{min}$ is the minimum suppression gain, and the output is then:

$$\hat{S}_k[m]=\zeta_k[m]E_k \qquad [m]$$

The direct mask described above can be extended to a bin-based mask (e.g., with each bin corresponding to a time-frequency position). To do so, we split the speech signal s[n] and echo signal d[n] into different frequency bands (the number of bands can be equal to or lower than the precision of our Fourier Transform analysis). Each signal $s_i[n]$ and $d_i[n]$ (i being the frequency band index) can then be processed independently using Equations 22 51 and 23 52 (with frequency-bin specific tuning parameters), providing a bin-based direct mask. With such an approach, tuning parameters for each band can be optimized independently.

Section 12

Parameter Selection Using "Optimization"

Values of the parameters defined in Section 11 ca be selected using genetic algorithm (GA). That said, other suitable approaches for solving nonlinear, combinatorial-type problems can be used, such as, for example, a grid search approach, greedy search algorithms, and other optimization methods.

The tuning problem can be formalized as an optimization problem. An objective function to attempt to maximize over the defined parameters is the ASR recognition rate $R(\hat{s})$, where $\hat{s}$ is the processed speech, the output of a speech enhancement system (e.g., as disclosed herein). We can reasonably assume that inequality constraint functions are linear and univariate, simplifying the constraints to determine lower and upper bounds limit for the components of the solution vector. On that assumption, the optimization problem then becomes:

maximize $R(\hat{s}[n,p])$ subject to $U \leq p \leq L$. (Equation 53)

where p represents the vector of the parameters to be tuned, $\hat{s}[n,p]$ is the speech enhancement system output obtained with those parameters, and L and U represent, respectively, lower and upper bounds for the values each variable.

12.1 Maximization Techniques

Since the objective function is not linear and not known to be convex, there are no effective methods for directly solving (Equation 53). Performing a brute force search with as few as ten variables can be extremely challenging, while problems with a few hundreds of variables can be intractable. As noted above in Section 3.2, so-called Genetic Algorithms (GA) have been successfully applied to this type of non-convex mixed-integer optimization. Various steps of such GA techniques are outlined below.

Step 1—An initial population of values)$\Pi^{(0)}=\{p_m^{(0)}, m=1, \ldots, M\}$, where M is the number of possible value sets in a single generation, is generated randomly with a uniform distribution over the space of feasible values [L,U].

Step 2—The cost function in (Equation 53) is evaluated for each set of values at the k th generation, $\Pi^{(k)}=\{p_m^{(k)}, m=1, \ldots, M\}$, and the best N sets are migrated to the next generation $\Pi^{(k+1)}$. The remaining M-N sets of values of $\Pi^{(k+1)}$ are generated from $\Pi^{(k)}$ either through crossover ($p_c$) or mutation ($p_m=1-p_c$).

Crossover—Given two sets of parameters from a previous generation $p_n^{(k)}, p_l^{(k)} \in \Pi^{(k)}$, a good but not optimum value of their cost function may be due to the fact that both sets approximate well some but not all parameters p. However, as the function $\hat{v}[n,p]$ is not invertible, we are unable to determine which parameters have a good/bad match. As a consequence, the crossover function $\Phi$ makes a random weighted mean of the two set of parameters.

Mutation—The mutation $p_m^{(k+1)}=\Psi(p_n^{(k)})$ of the set of values has the objective of preventing the falling of all elements in the population to a local minimum. Different heuristic approaches can be used to design a mutation function and we use two of the most common types of perturbations. The Uniform perturbation replaces the value of a chosen element with a uniform random value selected between the upper and lower bounds for that element. The Gaussian perturbation adds a unit Gaussian distributed random value a chosen vector element. If the value falls outside of the user-specified lower or upper bounds for that element, the value is clipped.

Step 3—Step 2 is repeated until a halting criterion is reached. The set of parameters $p_m^{(K)} \in \Pi^{(K)}$ with the largest value of the cost function will provide our estimate. The set of parameters $p_m^{(K)} \in \Pi^{(K)}$ that maximizes the cost function will be our estimate:

$$p = \underset{p_m^{(K)} \in \Pi^{(K)}}{\mathrm{argmax}} R(\hat{s}[n, p_m^{(K)}]) \qquad \text{(Equation 54)}$$

Section 13

Back-End Speech Recognizer and Experimental Results

13.1 Back-End Speech Recognizer

The signal processed by a voice-quality enhancer of the type described above is then processed by a back-end recognizer to extract features and proceeds with the sequence likelihood calculation based on the designed acoustic model distributions. As an alternative to commonly used HMMs (Hidden Markov Models), we chose two recently introduced statistical paradigms for modeling the distributions: one based on deep neural networks (DNN), and the other based on subspace Gaussian mixture models (SGMM). In both cases, a 40-dimensional feature vector was processed by the back-end recognizer. The recognizer included a perceptual linear prediction (PLP), linear discriminant analysis (LDA), maximum likelihood linear transform (MLLT), and feature-space maximum likelihood linear regression (fMLLR).

13.1.1 Deep Neural Networks

DNNs can evaluate the likelihood of a particular sequence using a feed-forward neural network that takes several frames of features as input and produces posterior probabilities over HMM states as output. DNNs can efficiently model data that lie on or near a nonlinear manifold in the data space. Thus, DNNs with many hidden layers have been shown to outperform GMMs on a variety of speech recognition benchmarks, sometimes by a large margin. The DNN architecture consists of 3 hidden layers with 1024 neurons in each layer and 11 frame inputs (5 past frames and 5 future frames).

13.1.2 Subspace Gaussian Mixture Models

In contrast with standard GMM-HMM systems where state level observation densities consist of a dedicated mixture of multivariate Gaussian mixtures in subspace GMM share a common structure. In this formalism, the means and mixture weights are controlled by a global mapping from a vector space, through one or more state projection vectors, to the GMM parameter space.

13.2 Experimental Results

In this section, we present the results from our designed speech enhancement front-end with the tuned parameters using the optimization method presented in Section 13.1, by way of example. In order to obtain the set of parameters that maximize the recognition rate, we optimized and tuned the system on a noisy TIMIT database and on our real-world command recordings.

13.2.1 Processing on TIMIT Database

13.2.1.1 Noisy TIMIT Database Generation

The database was generated by simulating the interaction between the user and the playback device. In this scenario, music is played from a loudspeaker system in which a microphone is placed one centimeter away from the loudspeaker. The microphone signal y[n] was then generated according to:

$$y[n]=s[n]+\sigma_1 d[n]+\sigma_2 v_2[n],$$

which consisted of the speech s[n], the acoustic echo from the music d[n] and the background noise $v_2[n]$ (babble noise). For each file in the TIMIT database, the SER and SNR were chosen from uniform distributions ranging from −30 dB to 10 dB and from 0 dB to 30 dB, respectively. We used 12 impulse responses recorded on the device in real rooms randomly picked and normalized to unitary energy. The values of $\sigma_1$ and $\sigma_2$ were calculated based on SER and SNR. The music sound, d[n], was randomly selected from five different music tracks of different genres with random starting points.

13.2.1.2 Recognition on Noisy TIMIT

Figure 14:
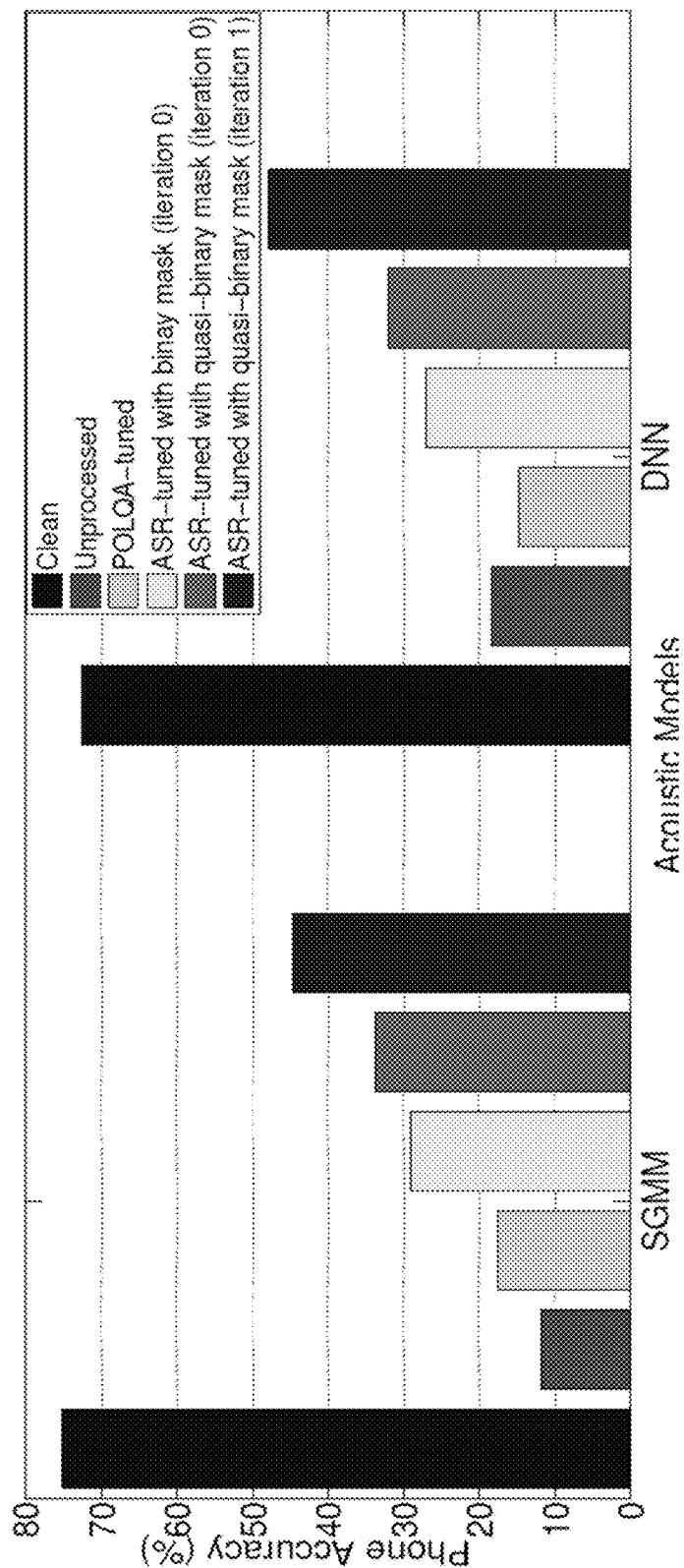
FIG. 14 shows a plot of phone accuracy rates for various tuning approaches.

FIG. 14: Phone accuracy (in %) for different noise conditions and different tuning parameters for both DNN and SGMM on noisy TIMIT. SNR is between 0 dB to 30 dB and SER is between −30 dB to 10 dB.

In order to optimize the parameters of our front-end speech enhancement system, we followed an iterative approach outlined below.

Iteration 0 (Initialization):
  (a) Train the acoustic models (DNN and SGMM) on clean TIMIT.
  (b) Tune the font-end parameters with our proposed tuning approach.

Iteration 1 and Higher:
  (a) Process simulated noisy TIMIT with our tuned front-end and generate processed TIMIT utterances.
  (b) Train the acoustic models with a mixture of clean TIMIT and processed TIMIT utterances.
  (c) Use the adapted acoustic models to re-tune the front-end with our proposed tuning technique using the database of clean and processed utterances.

Tuning of the parameters in the iterative approach can also be performed for parameters of the acoustic model (DNN, SGMM, HMM, etc.). Some of the parameters that can be optimized iteratively is: number of states for HMM, number of hidden layers for DNN, number of neurons per layer for DNN, etc.

In other words, at iteration 0, the tuning approach determines a set of parameter that output the "cleanest" speech, in order to match the clean TIMIT database characteristics. Due to the mismatch between the enhanced speech and the clean acoustic model, further iterations help reduce this mismatch and improve the ASR performance. Regardless of the iteration number, the GA had a population of M=40 possible candidates and K=3 were enough to reach convergence. These values were chosen empirically by balancing the complexity and the accuracy of the results.

FIG. 14 shows the phone accuracy of the clean TIMIT database, the unprocessed noisy database, the speech enhancement front-end tuned with the Perceptual Objective Listening Quality Assessment (POLQA,) subjective measure, and the speech enhancement front-end tuned with ASR. The acoustic models were trained on the clean TIMIT database except for the ASR optimized system tuned with 1 iteration. The system tuned with ASR outperforms the system tuned with POLQA. The phone accuracy on the clean TIMIT database (test set) with a triphone language model were 74.30% for DNN and 75.26% for SGMM, comparable to the performance reported in and, respectively. FIG. 14 also shows the phone accuracy when an iteration in the presented approach is used.

Although used in a different setup, the results obtained with the proposed method compared favorably to some prior results [?, ?], where authors investigated joint echo cancellation and speech enhancement at higher SERs and SNRs.

13.2.2 Processing on Real Commands

We used the system to recognize four commands: play, next, back, pause, as well as a garbage model. In this section two different scenarios are considered. We first use the set of tuned parameters for the speech enhancement system from our analysis on the TIMIT database to study the feasibility of speech recognition on limited vocabulary in extremely challenging conditions and assess the generalization of our tuning approach to unseen data (system trained on TIMIT but tested on commands). We then conducted another set of experiments where the tuning of the parameters was done on real recordings of actual commands.

Command Accuracy in % averaged over the four commands for different noise conditions and for different acoustic models. Clean: SNR=∞, SER=∞. Medium: SER=[−35'−30] dB, SNR=[0,5] dB. Loud: SER=[−40,−35] dB, SNR=[0,5] dB. First bar represents accuracy on clean recordings for both DNN and SGMM acoustic models. Second and third groups of bars represent results for DNN, while the fourth and fifth groups represent results for SGMM. ASR-tuned (TIMIT): GA tuning over the TIMIT database. ASR-tuned (command): GA tuning over the commands.

13.2.2.1 Recording of Commands Database

Figure 11:
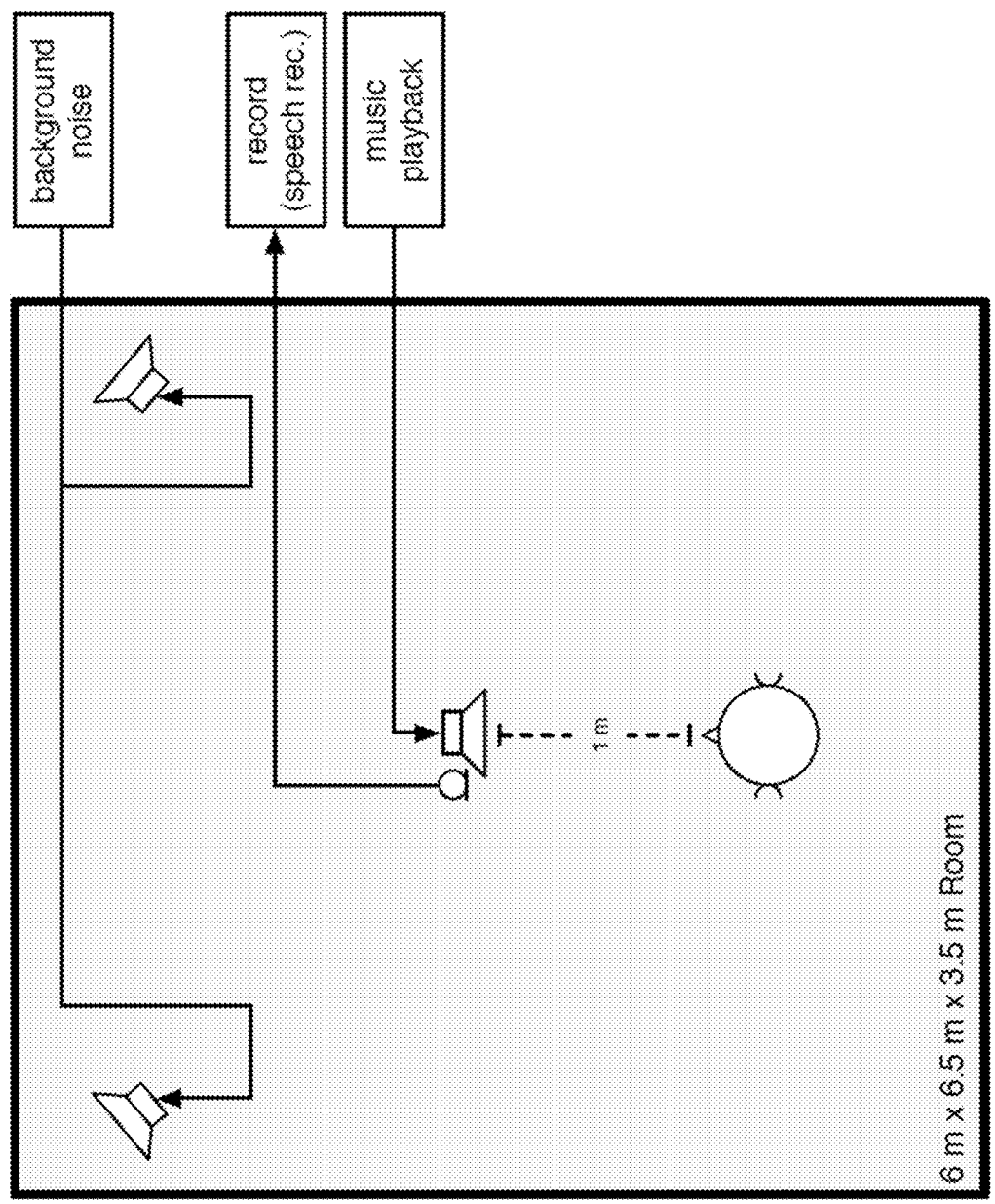
FIG. 11 shows a schematic illustration of an experimental setup for voice recording.
Figure 12:
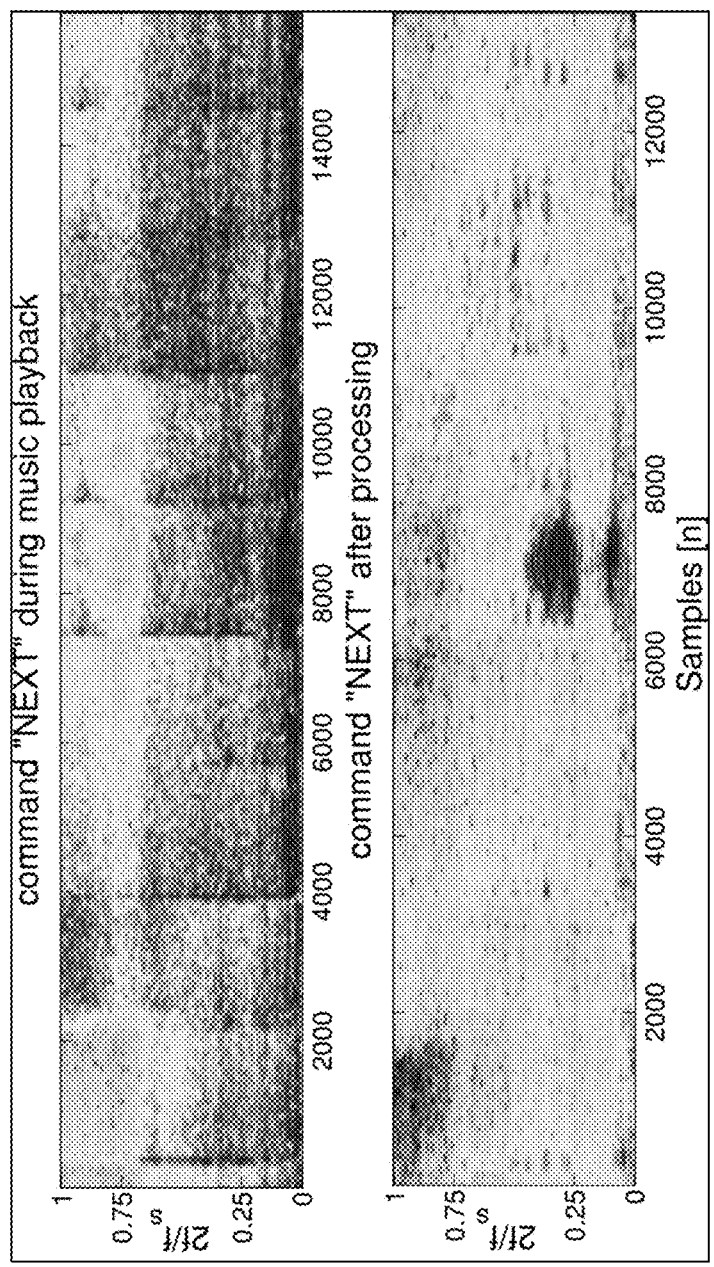
FIG. 12 shows a comparison plot of unprocessed and processed speech signals, with an original, unprocessed signal shown and a processed signal shown after processing according to techniques disclosed herein.
Figure 13:
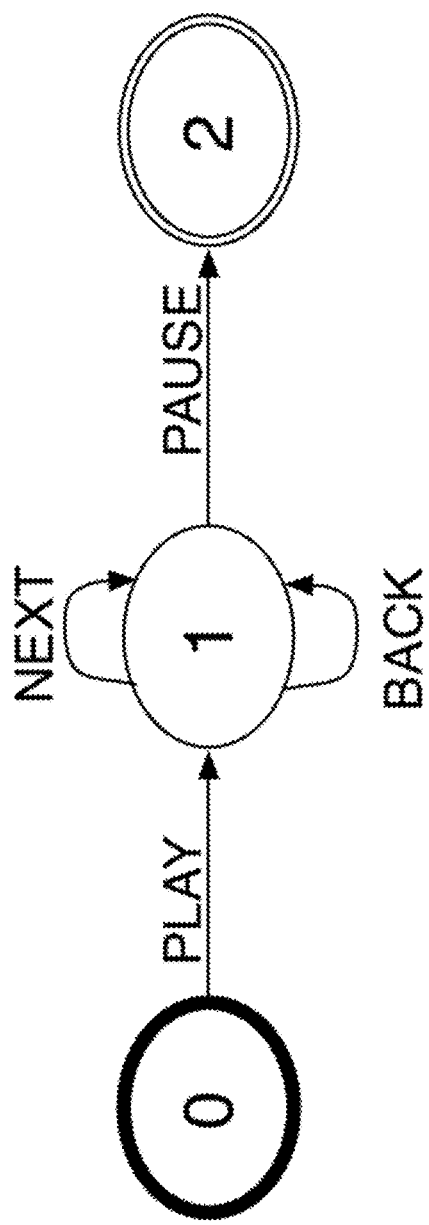
FIG. 13 shows a schematic illustration of various states within a command flow for a music playback device.

FIG. 11 shows the setup for voice recording, where eight subjects (male/female, native/non-native English speakers) uttered a list of commands at a distance of 1 meter from the microphone of the Beats Pill portable speaker while music was playing. We used eight different music tracks, where the starting point of the track was chosen randomly. Subjects uttered the following commands towards the speakers: play, next, back, pause. Ambient noise, recorded in a shopping mall containing a mixture of babble and other environmental noise, was played through separate loudspeakers facing the wall of the room to simulate diffuse noise. The music playback levels were set to three different levels: off, medium, and loud. We estimated that the range of SER for the medium and loud are −35 to −30 dB and −40 to −35 dB, respectively. The SNR of the ambient noise was set to 0 to 5 dB for the medium and loud scenarios. There is neither background noise nor music playback for the clean recordings. The estimation of the SERs was made possible thanks to a close-talking microphone that recorded the near-end speech. Furthermore, we measured the average C-weighted SPL of the music playback at the microphone to be 92 dBC and 102 dBC for the medium and loud cases respectively.

13.2.2.2 Recognition on Noisy Commands

Figure 15:
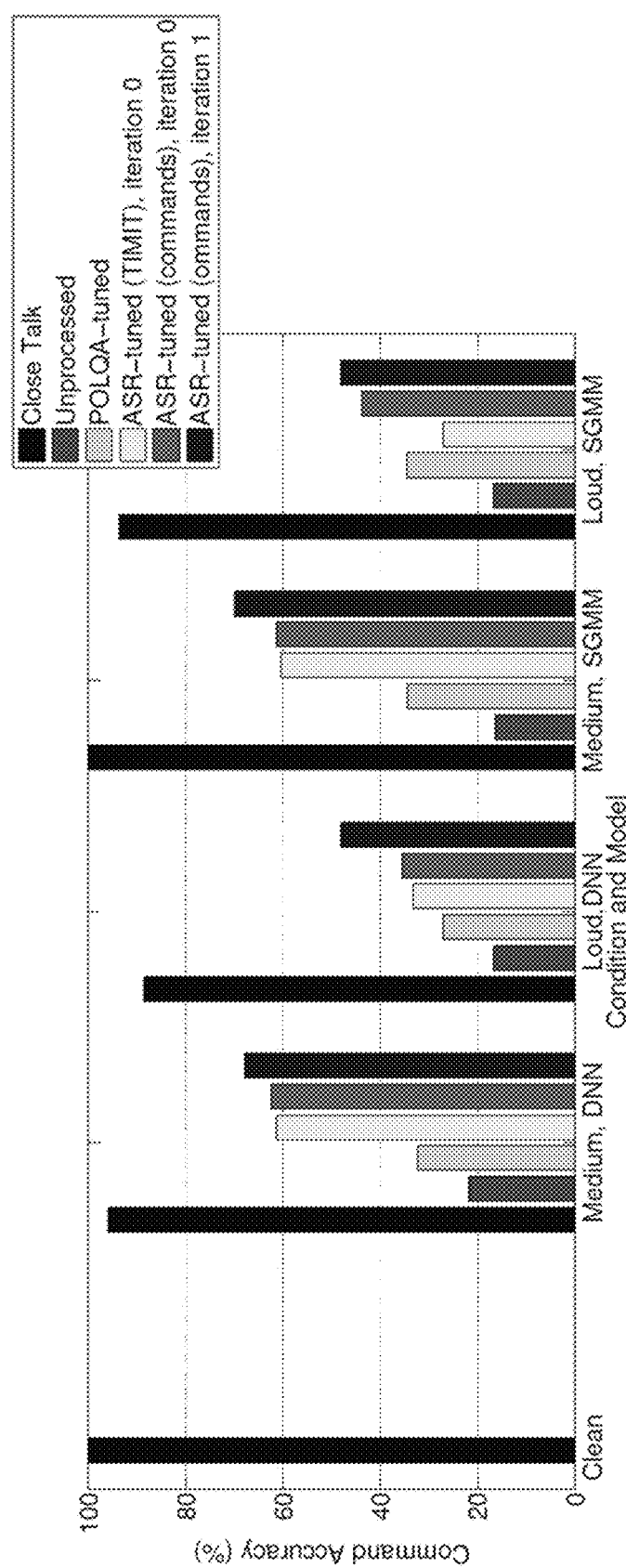
FIG. 15 shows command accuracy rates for various tuning approaches.

FIG. 15 shows the command recognition rates over the four commands for different noise and echo levels, different acoustic models, and different tuning parameters. The acoustic models in both DNN and SGMM were both trained using the clean TIMIT database. The parameters for the POLQA-tuned and ASR-tuned (TIMIT) cases were the system tuned when the target optimization function was an objective speech quality metric (POLQA) and the system tuned when the target was to maximize phone accuracy on noisy TIMIT (as described in Section 13.2.1.2), respectively. For the clean commands the accuracy for both DNN and SGMM was 100%, as expected for this small command list. The command recognition rate of the close talk microphone degrades slightly when there was music and background noise but was still around or above 90% in all cases. For the Beats Pill microphone recording during music playback and background noise, we obtained the best accuracy when the tuning was done on a mixture of both medium and loud conditions as in ASR-tuned (command). After 1 iteration the command recognition with SGMM is 70% for medium and 48% for loud. The same results for DNN are 67% and 48%.

Since the recording condition was not always known in advance, the command recognition on the mixed condition was also a good indication of the generalization capacity of our proposed approach. Furthermore, command accuracy from the optimization performed on TIMIT was within 2% absolute of the results obtained while optimizing on commands for the medium level scenario, which was a good indication of the generalization capacity of our proposed approach. The accuracy gap was wider between TIMIT-based optimization and the loud-level commands due to a mismatch between SER and SNR of the simulated TIMIT and loud commands. Our results also clearly showed that our proposed tuning based on ASR optimization outperforms the POLQA-based tuning. The difference in performance seemed to derive from the POLQA optimization being less aggressive on noise in order to preserve speech quality.

13.3 Summary of Speech Recognizer

We disclosed a robust ASR front-end and a related tuning methodology combined with a state-of-the-art speech recognition systems (DNN- and SGMM-based). The proposed speech enhancement front-end consists of a cascaded robust AEC, a residual echo power estimator based on a double-talk probability estimator, and a quasi-binary masking that utilizes the classical MMSE-based method at very low SNRs. The tuning improved the speech recognition rate substantially on the TIMIT database. The optimized front-end was then tested in realistic environments for the remote control of a music playback device with a limited-sized command dictionary. The result showed a fairly high recognition rate for voice commands at a speech-to-music ratio as low as −40 dB and SNR as low as 0 dB, scenarios hardly seen through the literature. In our experiments, SGMM outperformed DNN in noisy conditions. However, training the DNN on a larger corpus can potentially improve recognition results on DNN. In fact, training the DNN on a larger dataset including noisy and clean TIMIT improved the overall recognition rate of the DNN when our proposed iterative approach was used. We also showed that training the back-end ASR and tuning our front-end speech enhancement system in the iterative approach improved the overall recognition results.

Section 14

Computing Environments

Figure 16:
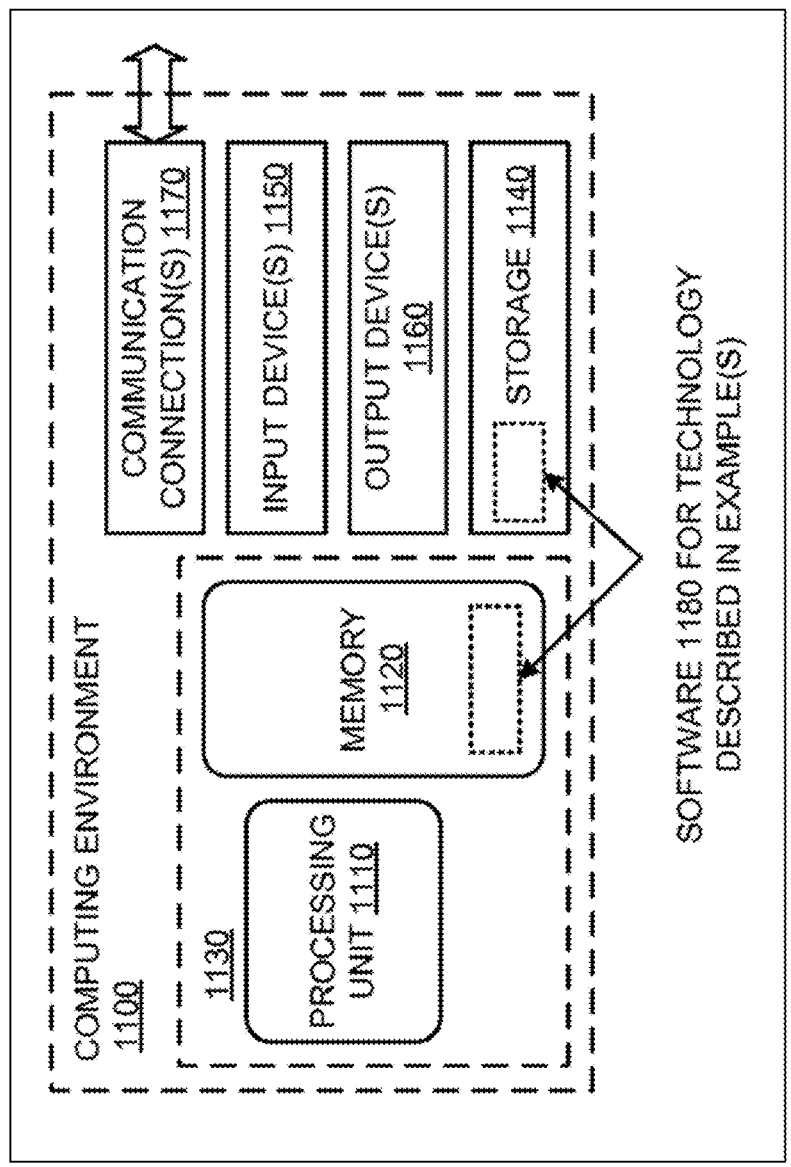
FIG. 16 shows a schematic illustration of a computing environment suitable for implementing one or more technologies disclosed herein.

FIG. 16 illustrates a generalized example of a suitable computing environment 1100 in which described methods, embodiments, techniques, and technologies relating, for example, to enhancing perceived quality of a speech signal, may be implemented. The computing environment 1100 is not intended to suggest any limitation as to scope of use or functionality of the technologies disclosed herein, as each technology may be implemented in diverse general-purpose or special-purpose computing environments. For example, each disclosed technology may be implemented with other computer system configurations, including hand held devices, multiprocessor systems, microprocessor-based or programmable consumer electronics, network PCs, mini-computers, mainframe computers, smartphones, and the like. Each disclosed technology may also be practiced in distributed computing environments where tasks are performed by remote processing devices that are linked through a communications network. In a distributed computing environment, program modules may be located in both local and remote memory storage devices.

With reference to FIG. 16 the computing environment 1100 includes at least one central processing unit 1110 and memory 1120. In FIG. 16, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement one or more of the innovative technologies described herein.

A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other tangible, non-transitory medium which can be used to store information and which can be accessed within the computing environment 1100. The storage 1140 stores instructions for the software 1180, which can implement technologies described herein.

The input device(s) 1150 may be a touch input device, such as a keyboard, keypad, mouse, pen, touchscreen or trackball, a voice input device, a scanning device, or another device, that provides input to the computing environment 1100. For audio, the input device(s) 1150 may include a microphone or other transducer (e.g., a sound card or similar device that accepts audio input in analog or digital form), or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, or other data in a modulated data signal.

Tangible computer-readable media are any available, tangible media that can be accessed within a computing environment 1100. By way of example, and not limitation, with the computing environment 1100, computer-readable media include memory 1120, storage 1140, communication media (not shown), and combinations of any of the above. Tangible computer-readable media exclude transitory signals.

Section 15

Other Embodiments

The examples described above generally concern speech enhancement techniques and related systems. Other embodiments than those described above in detail are contemplated based on the principles disclosed herein, together with any attendant changes in configurations of the respective apparatus described herein. Incorporating the principles disclosed herein, it is possible to provide a wide variety of systems adapted to enhance speech contained in an impaired speech signal, for example, in "hands-free" communication systems, in aviation communication systems, in conference room speaker phones, in auditorium sound systems, etc.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of filtering and computational techniques that can be devised using the various concepts described herein. Moreover, those of ordinary skill in the art will appreciate that the exemplary embodiments disclosed herein can be adapted to various configurations and/or uses without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We currently claim:

1. A media device having a loudspeaker, a microphone, and a digital signal processor comprising:
an echo canceller arranged to receive an input signal from the microphone and to receive a reference signal, wherein the echo canceller is configured to subtract one or more linear components of the reference signal from the input signal;
a noise suppressor configured to suppress non-linear effects of the reference signal in each of a plurality of frequency bins in the input signal, wherein a degree of suppression provided by the noise suppressor for each frequency bin corresponds to an estimate of residual echo remaining in the respective frequency bin after the one or more linear components of the reference signal have been subtracted from the input signal, to an estimated double-talk probability, and to an estimated signal-to-noise ratio of near-end speech in the input signal for each respective frequency bin; and a speech recognizer arranged to receive a processed input signal from the noise suppressor and to recognize an utterance from the processed input signal, wherein the media device is configured to be controlled responsively to the cognized utterance.

2. A media device according to claim 1, wherein the noise suppressor applies a spectral gain or a binary mask to the input signal in correspondence with the estimated signal-to-noise ratio of near-end speech in the input signal.

3. A media device according to claim 1, wherein the noise suppressor applies a selected one of a spectral gain and a binary mask to the input signal responsive to the estimated signal-to-noise ratio of near-end speech in the input signal exceeding a predefined signal-to-noise threshold.

4. A media device according to claim 3, wherein the predefined signal-to-noise threshold comprises a first signal-to-noise threshold corresponding to a first frequency bin of the input signal, the spectral gain or the binary mask comprises a first spectral gain or a first binary mask, respectively, and the noise suppressor applies the selected one of the first spectral gain and the first binary mask to the first frequency bin of the input signal responsive to the estimated signal-to-noise ratio of near-end speech in the first frequency bin exceeding the first signal-to-noise threshold, and wherein the noise suppressor applies a selected one of a second spectral gain and a second binary mask to a second frequency bin of the input signal in correspondence with an estimated signal-to-noise ratio of near-end speech in the second frequency bin of the input signal.

5. A media device according to claim 1, wherein the noise suppressor applies a selected one of a spectral gain and a binary mask to the input signal responsive to the estimated signal-to-noise ratio of near-end speech in the input signal falling below a predefined signal-to-noise threshold.

6. A media device according to claim 5, wherein the predefined signal-to-noise threshold comprises a first signal-to-noise threshold corresponding to a first frequency bin of the input signal, the spectral gain or the binary mask comprises a first spectral gain or a first binary mask, respectively, and the noise suppressor applies the selected one of the first spectral gain and the first binary mask to the first frequency bin of the input signal responsive to the estimated signal-to-noise ratio of near-end speech in the first frequency bin falling below the first signal-to-noise threshold, and wherein the noise suppressor applies a selected one of a second spectral gain and a second binary mask to a second frequency bin of the input signal in correspondence with an estimated signal-to-noise ratio of near-end speech in the second frequency bin of the input signal.

7. Tangible, non-transitory computer-readable media including instructions that, when executed, cause a computing environment to implement a method comprising:

subtracting linear components of a reference signal from an input signal emitted from a microphone;

estimating one or more of a residual echo remaining in the input signal after the act of subtracting linear components, a double-talk probability, and a signal-to-noise ratio of near-end speech in the input signal;

suppressing non-linear effects of the reference signal in each of a plurality of frequency bins of the input signal in correspondence with the estimated one or more of the estimated residual echo, the estimated double-talk probability, and the estimated signal-to-noise ratio for each respective frequency bin;

recognizing near-end speech in the input signal after suppressing non-linear effects of the reference signal in the plurality of frequency bins of the input signal:

controlling a computing environment responsively to the recognized near-end speech.

8. Tangible, non-transitory computer-readable media according to claim 7, wherein the act of estimating the double-talk probability comprises comparing an estimated echo signal to the input signal from the microphone for each of the frequency bins.

9. Tangible, non-transitory computer-readable media according to claim 7, wherein the act of estimating residual echo comprises determining a coherence of the input signal to a signal representative of the reference signal when the double-talk probability exceeds a selected threshold probability for each of the frequency bins.

10. Tangible, non-transitory computer-readable media according to claim 7, wherein the act of estimating residual echo comprises determining a coherence of an error signal from an echo canceller to a signal representative of the input signal when the double-talk probability falls below a selected threshold probability for each of the frequency bins.

11. Tangible, non-transitory computer-readable media according to claim 7, wherein the act of suppressing non-linear effects of the reference signal in the input signal comprises applying a spectral gain or a binary mask to the input signal in correspondence with the estimated signal-to-noise ratio of near-end speech in the input signal for each respective frequency bin.

12. Tangible, non-transitory computer-readable media according to claim 7, wherein the act of suppressing non-linear effects comprises applying a selected one of a spectral gain and a binary mask to the input signal responsive to an estimated signal-to-noise ratio of near-end speech in the input signal exceeding a predefined signal-to-noise threshold.

13. Tangible, non-transitory computer-readable media according to claim 12, wherein the predefined signal-to-noise threshold comprises a first signal-to-noise threshold corresponding to a first frequency bin of the input signal, the spectral gain or the binary mask comprises a corresponding first spectral gain or first binary mask, respectively, and the act of applying a selected one of a spectral gain and a binary mask to the input signal comprises applying the selected one of the first spectral gain and the first binary mask to the first frequency bin of the input signal responsive to the estimated signal-to-noise ratio of near-end speech in the first frequency bin exceeding the first signal-to-noise threshold, and applying a selected one of a second spectral gain and a second binary mask to a second frequency bin of the input signal in correspondence with an estimated signal-to-noise ratio of near-end speech in the second frequency bin of the input signal.

14. Tangible, non-transitory computer-readable media according to claim 7, wherein the act of suppressing non-linear effects comprises applying a selected one of a spectral gain and a binary mask to the input signal responsive to the estimated signal-to-noise ratio of near-end speech in the input signal falling below a predefined signal-to-noise threshold.

15. Tangible, non-transitory computer-readable media according to claim 14, wherein the predefined signal-to-noise threshold comprises a first signal-to-noise threshold corresponding to a first frequency bin of the input signal, the spectral gain or the binary mask comprises a corresponding first spectral gain or first binary mask, respectively, and the act of applying a selected one of a spectral gain and a binary mask to the input signal comprises applying the selected one of the first spectral gain and the first binary mask to the first frequency bin of the input signal responsive to the estimated signal-to-noise ratio of near-end speech in the first frequency bin falling below the first signal-to-noise threshold, and applying a selected one of a second spectral gain and a second binary mask to a second frequency bin of the input signal in correspondence with an estimated signal-to-noise ratio of near-end speech in the second frequency bin of the input signal.

16. A media device having a loudspeaker, a microphone, and a digital signal processor comprising:
    an echo canceller arranged to receive an input signal from the microphone and to receive a reference signal, wherein the echo canceller is configured to subtract one or more linear components of the reference signal from the input signal;
    a noise suppressor configured to suppress non-linear effects of the reference signal in each of a plurality of frequency bins in the input signal, wherein a degree of suppression provided by the noise suppressor to each frequency bin corresponds to an estimate of residual echo remaining in the respective frequency bin after the one or more linear components of the reference signal have been subtracted from the input signal, to an estimated double-talk probability, and to an estimated signal-to-noise ratio of near-end speech in the input signal for each respective frequency bin, wherein the estimate of residual echo, the estimated double-talk probability and the estimated signal-to-noise ratio correspond to at least 20 different tunable parameters; and
    a speech recognizer arranged to receive a processed input signal from the noise suppressor and to recognize an utterance from the processed input signal, wherein the media device is further configured to be controlled responsively to the recognized utterance.

17. A media device according to claim 16, wherein the noise suppressor applies a selected one of a spectral gain and a binary mask to the input signal responsive to the estimated signal-to-noise ratio of near-end speech in the input signal exceeding a predefined signal-to-noise threshold.

18. A media device according to claim 17, wherein the predefined signal-to-noise threshold comprises a first signal-to-noise threshold corresponding to a first frequency bin of the input signal, the spectral gain or the binary mask comprises a first spectral gain or a first binary mask, respectively, and the noise suppressor applies the selected one of the first spectral gain and the first binary mask to the first frequency bin of the input signal responsive to the estimated signal-to-noise ratio of near-end speech in the first frequency bin exceeding the first signal-to-noise threshold, and wherein the noise suppressor applies a selected one of a second spectral gain and a second binary mask to a second frequency bin of the input signal in correspondence with an estimated signal-to-noise ratio of near-end speech in the second frequency bin of the input signal.

19. A media device according to claim 16, wherein the noise suppressor applies a selected one of a spectral gain and a binary mask to the input signal responsive to the estimated signal-to-noise ratio of near-end speech in the input signal falling below a predefined signal-to-noise threshold.

20. A media device according to claim 19, wherein the predefined signal-to-noise threshold comprises a first signal-to-noise threshold corresponding to a first frequency bin of the input signal, the spectral gain or the binary mask comprises a first spectral gain or a first binary mask, respectively, and the noise suppressor applies the selected one of the first spectral gain and the first binary mask to the first frequency bin of the input signal responsive to the estimated signal-to-noise ratio of near-end speech in the first frequency bin falling below the first signal-to-noise threshold, and wherein the noise suppressor applies a selected one of a second spectral gain and a second binary mask to a second frequency bin of the input signal in correspondence with an estimated signal-to-noise ratio of near-end speech in the second frequency bin of the input signal.

\* \* \* \* \*